United States Patent
Rabipour et al.

(10) Patent No.: US 11,277,354 B2
(45) Date of Patent: Mar. 15, 2022

(54) DYNAMIC ADJUSTMENT OF WORKLOAD FORECAST

(71) Applicants: Rafi Rabipour, Cote St. Luc (CA); Claes Göran Robert Edström, Beaconsfield (CA)

(72) Inventors: Rafi Rabipour, Cote St. Luc (CA); Claes Göran Robert Edström, Beaconsfield (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/769,630

(22) PCT Filed: Dec. 14, 2017

(86) PCT No.: PCT/IB2017/057973
§ 371 (c)(1),
(2) Date: Jun. 4, 2020

(87) PCT Pub. No.: WO2019/116083
PCT Pub. Date: Jun. 20, 2019

(65) Prior Publication Data
US 2021/0176189 A1    Jun. 10, 2021

(51) Int. Cl.
*H04L 12/927* (2013.01)
*H04L 12/24* (2006.01)
(Continued)

(52) U.S. Cl.
CPC ............ *H04L 47/805* (2013.01); *G06F 9/505* (2013.01); *G06F 9/5011* (2013.01);
(Continued)

(58) Field of Classification Search
CPC . H04L 41/5003; H04L 47/748; H04L 47/781; H04L 47/805; Y02D 10/00;
(Continued)

(56) References Cited

U.S. PATENT DOCUMENTS

| | | | | |
|---|---|---|---|---|
| 7,672,923 B1 * | 3/2010 | Reed | ..................... | H04L 67/104 706/50 |
| 7,693,982 B2 * | 4/2010 | Goldszmidt | ........... | G06Q 10/04 709/224 |

(Continued)

FOREIGN PATENT DOCUMENTS

EP    3086611 A1    10/2016

OTHER PUBLICATIONS

International Search Report and Written Opinion issued on corresponding International Application PCT/IB2017/057973.
(Continued)

*Primary Examiner* — Thomas J Dailey
(74) *Attorney, Agent, or Firm* — Ericsson Canada Inc.

(57) ABSTRACT

The disclosure relates to a method, network node and service instance, the method being executed by a service provider, for optimizing resource allocation according to the needs of at least one client and according to an SLA between the client and the service provider. The method comprises obtaining a statistical behavior of a workload forecast function associated with a service of the client, obtaining a forecast value for a future workload from the workload forecast function associated with the service of the client, obtaining at least one service-level objective associated with the SLA between the client and the service provider, obtaining a modified forecast value based on the forecast value, the statistical behavior of the workload forecast function and service-level objective associated with the SLA, and adjusting resources allocated to the service based on the modified forecast thereby optimizing resource allocation for the at least one client.

15 Claims, 18 Drawing Sheets

(51) Int. Cl.
  *H04L 12/911* (2013.01)
  *G06F 9/50* (2006.01)
  *G06Q 10/06* (2012.01)
  *H04L 47/80* (2022.01)
  *H04L 41/5003* (2022.01)
  *H04L 47/74* (2022.01)
  *H04L 47/78* (2022.01)

(52) U.S. Cl.
  CPC ........... *G06F 9/5061* (2013.01); *G06Q 10/06* (2013.01); *H04L 41/5003* (2013.01); *H04L 47/748* (2013.01); *H04L 47/781* (2013.01); *G06F 2209/5019* (2013.01); *Y02D 10/00* (2018.01)

(58) Field of Classification Search
  CPC ........... G06F 2209/5019; G06F 9/5061; G06F 9/505; G06F 9/5011
  See application file for complete search history.

(56) References Cited

U.S. PATENT DOCUMENTS

| | | | |
|---|---|---|---|
| 8,073,730 B2* | 12/2011 | Vanbeck | G06Q 40/02 705/7.38 |
| 8,234,229 B2 | 7/2012 | Castelli et al. | |
| 8,806,003 B2 | 8/2014 | Brown et al. | |
| 9,426,036 B1* | 8/2016 | Roy | H04L 41/145 |
| 10,841,236 B1* | 11/2020 | Jin | G06F 9/5072 |
| 2008/0295096 A1 | 11/2008 | Beaty et al. | |
| 2010/0228858 A1 | 9/2010 | Eilam et al. | |
| 2010/0280861 A1 | 11/2010 | Rossen et al. | |
| 2011/0178790 A1* | 7/2011 | Golbourn | G06F 9/5011 703/22 |
| 2011/0202387 A1* | 8/2011 | Sayal | G06Q 10/06375 705/7.31 |
| 2011/0302578 A1 | 12/2011 | Isci et al. | |

OTHER PUBLICATIONS

Rashid Mijumbi, et al., "Topology-Aware Prediction of Virtual NetworkFunction Resource Requirements", IEEE Transactions on Network and Service Management, vol. 14, No. 1, Mar. 2017, pp. 106-120.

Liuhua Chen, et al., "Towards Resource-Efficient Cloud Systems: Avoiding Over-Provisioning in Demand-Prediction Based Resource Provisioning", 2016 IEEE International Conference on Big Data (Big Data), pp. 1-10.

Massimiliano Menarini, et al., "Green Web Services: Improving Energy Efficiency in Data Centers via Workload Predictions", Department of Computer Science and Engineering, University of California San Diego, GREENS 2013, San Francisco, CA, USA, pp. 1-8.

Hiep Nguyen, et al., "AGILE: elastic distributed resource scaling for Infrastructure-as-a-Service", USENIX Association 10th International Conference on Autonomic Computing (ICAC '13), pp. 69-82.

* cited by examiner

DYNAMIC ADJUSTMENT OF WORKLOAD FORECAST

TECHNICAL FIELD

The present disclosure relates to the management of resources in virtualization environments.

BACKGROUND

The telecommunication industry is in the midst of a major trend in which traditional hardware-based systems are being replaced with virtualized network functions deployed on server farms. One of the important factors motivating this trend is the desire for efficient use of infrastructure equipment. More specifically, it is expected that the notion of on-demand scaling of applications (to match changes in the level of required services) will enable the industry to optimize the use of the infrastructure equipment by moving away from the need for static over-provisioning based on worst-case capacity demands, which will decrease operational expenses through reduced energy consumption.

This vision relies on the underlying Cloud Computing architecture for rapid, "just-in-time" deployment of additional virtual resources for allocation to applications in response to rising demand for service.

However, the task of scaling virtualized applications cannot be achieved instantaneously; it takes time to spin up, boot, and load virtual machines or containers with the specifically required applications and supporting software. This makes it very desirable to predict the level of required resources, or equivalently, the level of workload, to enable the timely adjustment of the amount of resources made available to a specific application to meet the (dynamic) requirements of traffic volume.

This need has spurred activity, both in the industry and academia, to develop techniques and algorithms for predicting workloads (or resource requirements) and to improve their accuracy.

However, workload prediction algorithms are unlikely to be perfect and the prediction error will be non-zero. Therefore, in practice, such algorithms often aim at finding a balance between underestimation of the workload, e.g. risking the violation of Service-Level Agreements (SLA) and the incurring of penalties, and overestimation, causing waste of resources and unnecessary power consumption.

SUMMARY

There is provided a method, executed by a service provider, for optimizing resource allocation according to the needs of at least one client and according to an SLA between the at least one client and the service provider. The method comprises obtaining a statistical behavior of a workload forecast function associated with a service of the at least one client. The method comprises obtaining a forecast value for a future workload from the workload forecast function associated with the service of the at least one client. The method comprises obtaining at least one service-level objective associated with the SLA between the at least one client and the service provider. The method comprises obtaining a modified forecast value based on the forecast value, the statistical behavior of the workload forecast function and service-level objective associated with the SLA. The method comprises adjusting resources allocated to the service based on the modified forecast thereby optimizing resource allocation for the at least one client.

There is provided a network node for optimizing resource allocation according to the needs of at least one client and according to an SLA between the at least one client and a service provider. The network node comprises processing circuitry and a transceiver configured, in combination, to obtain a statistical behavior of a workload forecast function associated with a service of the at least one client, obtain a forecast value for a future workload from the workload forecast function associated with the service of the at least one client, obtain at least one service-level objective associated with the SLA between the at least one client and the service provider, obtain a modified forecast value based on the forecast value, the statistical behavior of the workload forecast function and service-level objective associated with the SLA, and adjust resources allocated to the service based on the modified forecast. The network node also comprise power supply circuitry configured to supply power to said network node.

There is provided a non-transitory computer readable media having stored thereon instructions for optimizing resource allocation according to the needs of at least one client and according to an SLA between the at least one client and a service provider. The instructions comprise obtaining a statistical behavior of a workload forecast function associated with a service of the at least one client. The instructions comprise obtaining a forecast value for a future workload from the workload forecast function associated with the service of the at least one client. The instructions comprise obtaining at least one service-level objective associated with the SLA between the at least one client and the service provider. The instructions comprise obtaining a modified forecast value based on the forecast value, the statistical behavior of the workload forecast function and service-level objective associated with the SLA. The instructions comprise adjusting resources allocated to the service based on the modified forecast.

There is provided a service instance for optimizing resource allocation according to the needs of at least one client and according to an SLA between the at least one client and a service provider, in a cloud computing environment which provides processing circuitry, interface circuitry and memory for running the service instance. The memory contains instructions executable by the processing circuitry whereby the service instance is operative to obtain a statistical behavior of a workload forecast function associated with a service of the at least one client, obtain a forecast value for a future workload from the workload forecast function associated with the service of the at least one client, obtain at least one service-level objective associated with the SLA between the at least one client and the service provider, obtain a modified forecast value based on the forecast value, the statistical behavior of the workload forecast function and service-level objective associated with the SLA, and adjust resources allocated to the service based on the modified forecast.

The methods, systems and apparatuses provided herein present improvements to the way workload prediction methods, systems and apparatuses, operate.

At least some of the embodiments described here provide some or all the following advantages.

No knowledge of the design of the underlying workload prediction algorithm is needed. The methods can be applied to any workload prediction algorithm (as long as the algorithm's prediction-error statistics have "reasonably" stationary characteristics). This includes third-party products, and applies in environments where a variety of such predictors may be deployed.

The methods can adjust the outcome of the underlying workload prediction algorithms to achieve a target service-level objective while minimizing the amount of unused resources. Furthermore, the methods facilitate the introduction of SLA models based on resource oversubscription. Alternatively, the same methods can also be used to provide a controllable amount of padding in critical cases where resource underestimation may incur a penalty.

As an alternative to targeting SLA performance objectives, the methods can be used to minimize a measure of the combined impact of penalty and overhead due to, respectively, resource underestimation and overestimation—referred to from this point on as "penalty-overhead". The methods do not degrade the operation of the underlying workload prediction algorithms.

Unlike conventional padding approaches, the proposed methods act to reduce the amount of workload forecast (and hence, operational overhead) in cases where the SLA objectives are overshot due to an underlying prediction algorithm that is too conservative.

The methods have very modest computational requirements.

The methods are not affected by changes to the underlying workload prediction system (as long as the underlying workload prediction system retain stationary prediction-error characteristics), allowing the operator to revise, upgrade or otherwise swap the prediction algorithm without requiring any further adjustment of the Dynamic Prediction Adjustment (DPA) layer.

DETAILED DESCRIPTION

Figure 1:
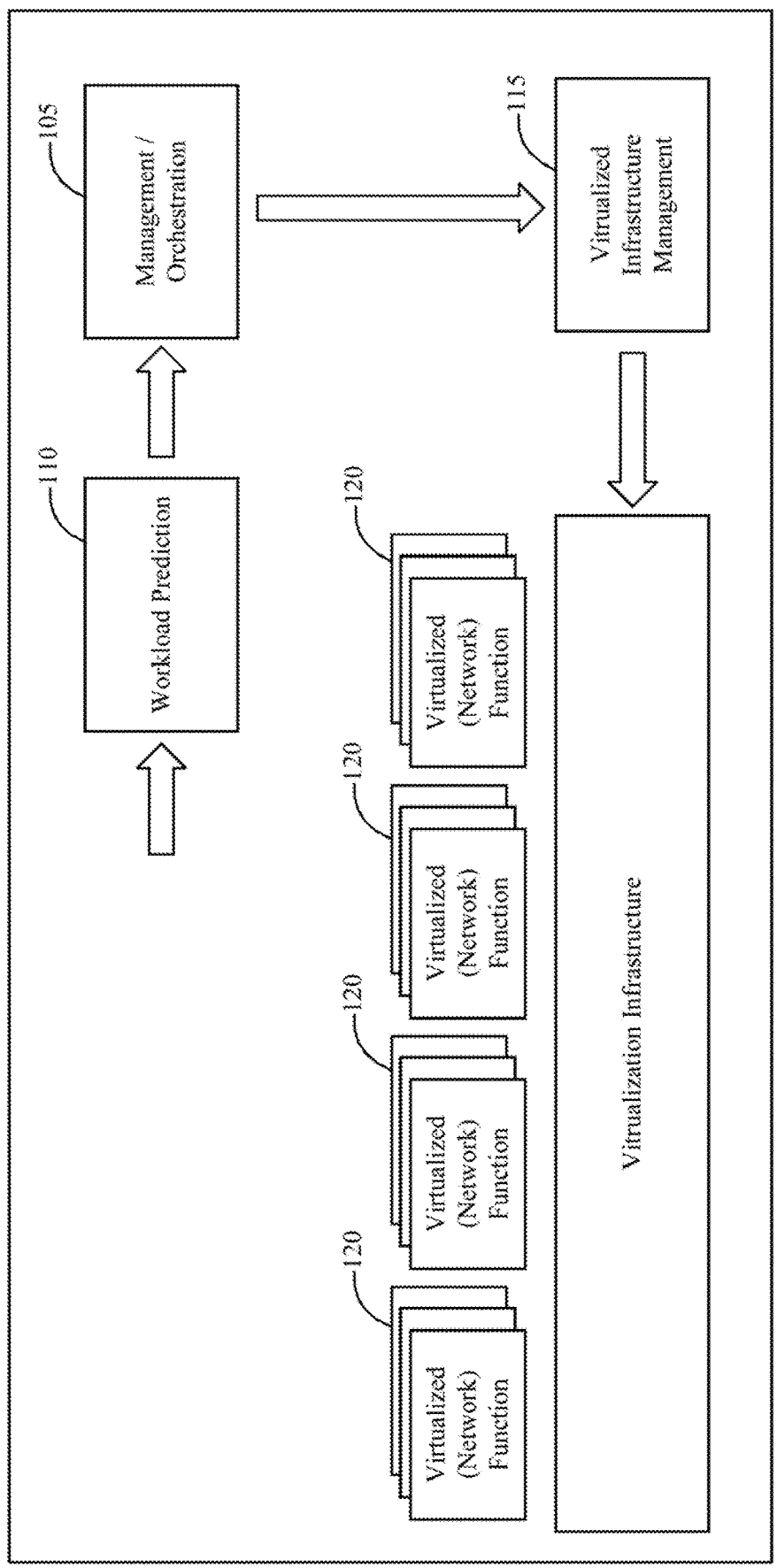
FIG. 1 a diagram illustrating a high-level view of workload prediction usage without prediction adjustment.

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions or simultaneously. Furthermore, in some illustrations, some blocks, functions or actions may be optional and may or may not be executed; these are generally illustrated with dashed lines.

Specific techniques and methods for prediction of workloads and resource requirements exist today, including (in some cases) padding algorithms to reduce the occurrences of underestimation of needed resources.

The methods described here provide mechanisms that can be added on top of any algorithm devised to forecast workload (or the level of required resources) that has stationary prediction-error characteristics, to allow the adjustment of the output of such algorithm in accordance with different business objectives. Some methods allow the adjustment of forecast workloads in order to target specific service-level objectives, for the purpose of meeting service-level agreements (SLA).

Some other methods enable dynamic adjustments for runtime balancing of overestimation vs. underestimation, for the purpose of minimizing the sum of unused resources overhead and SLA violation penalties.

Known methods cover a range of approaches and algorithms designed to forecast workloads (and hence the required resources) as accurately as possible, most of which are devised to achieve a "fixed" balance between overestimation and underestimation. As such, these techniques are intended to predict workloads as correctly as possible, but in general they are not equipped with the flexibility to target varying performance levels that might be necessary to meet service-level commitments for different tiers of customers using the same service, or to manage trade-offs in a generic manner. Some of the more recent methods use "padding" to minimize the number of underestimations that may lead to SLA violations. However, in addition to the disadvantage of high computational complexity, the padding approaches are usually tailored to a specific workload forecast algorithm, and may not be reusable if a mix of prediction algorithms are deployed. This may limit their usefulness, as it is likely that specific workload prediction algorithms may be better suited to one range of applications and less so with others, necessitating the use of a variety of workload predictors in a given system.

Therefore, a generic, low-complexity approach that does not rely on the knowledge of the workload prediction algorithm, and which adapts dynamically to the performance of the underlying predictor provides an important practical advantage.

In addition, depending on the formulation of a specific SLA, meeting the terms of the SLA may not always be the most advantageous or effective option. As such, algorithms that are designed to maximize the likelihood of achieving the target SLA performance, often by erring on the side of overestimation to reduce underestimation, may actually incur higher operational penalty-overhead.

Figure 2:
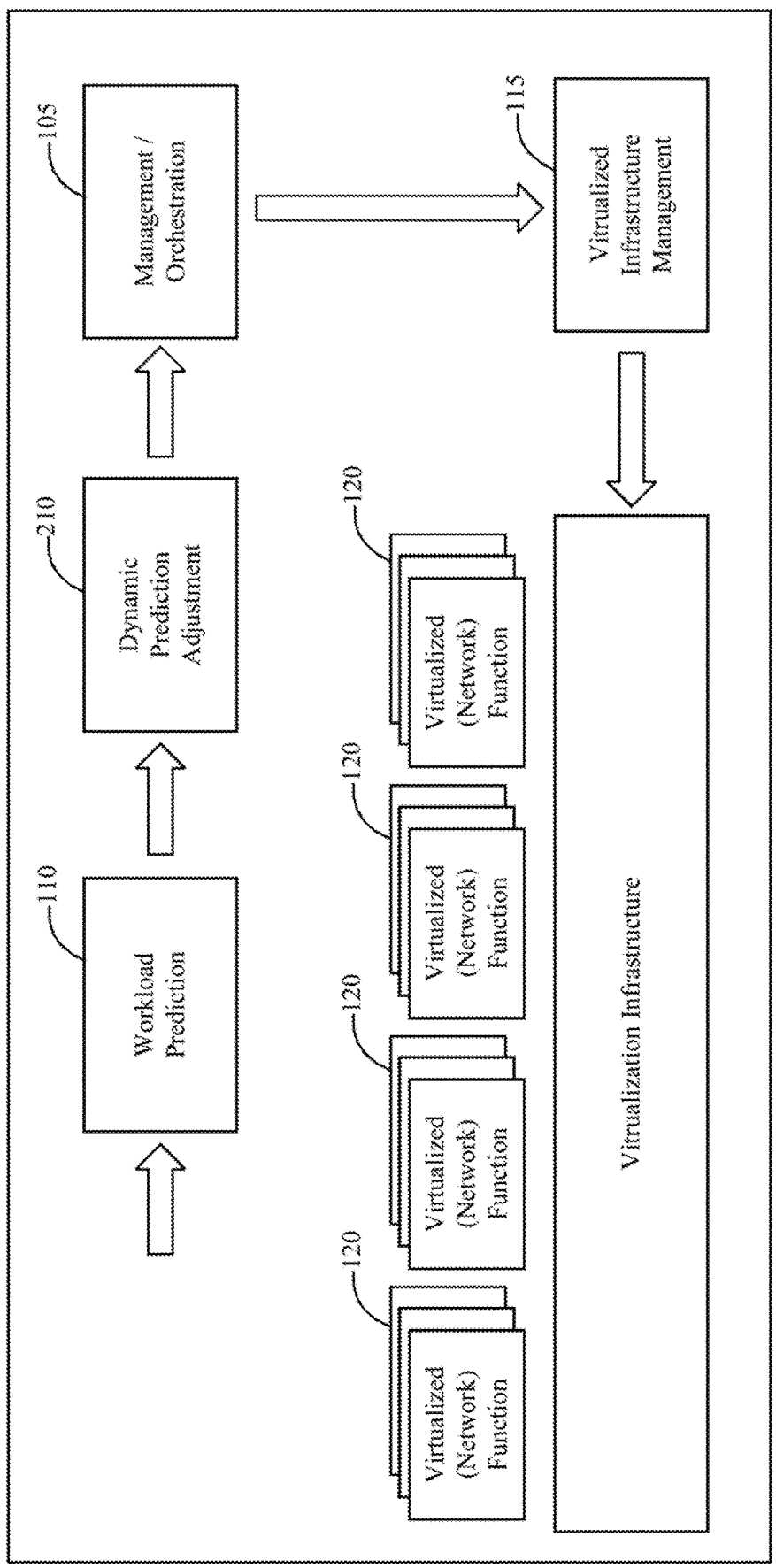
FIG. 2 is a diagram illustrating a high-level view of workload prediction usage with prediction adjustment.

FIG. 1 shows a high-level view of how workload prediction is generally envisioned to be used in the service of elasticity. Depending on its design, the workload prediction algorithm processes various types of information (e.g. past load information, signaling data, relevant performance indicators, etc.) to generate a forecast for the upcoming workload. The management/orchestration function 105 uses a workload forecast generated by the workload prediction function 110 to request appropriate changes in the level of provided resources from the Virtualized Infrastructure Manager (VIM) 115 in order to make sufficient resources available to the virtualized (network) functions 120 in a timely manner. FIG. 2 shows where the proposed Dynamic Prediction Adjustment (DPA) 210, fits in the topology. The function of DPA 210 is to process the forecast produced by the workload prediction function 110, and to modify it (based on the past performance of the workload prediction algorithm) in accordance with the objectives of the service provider. The Dynamic Prediction Adjustment contains two parts, each addressing a different objective:

The first part, which is completely self-contained and independent of the second part, tracks the performance statistics of the underlying workload forecasting method, and scales its forecast value using a factor calculated dynamically to alter the prediction-error statistics so as to achieve a specified performance target that is typically based on SLA requirements.

The second part is an add-on which uses the statistical method of the first part; it tracks the penalty-overhead of multiple performance targets and dynamically selects a scale factor—to scale the workload forecast—corresponding to the performance target that yields the lowest total of: the overhead of unused (overestimated) resources and the penalty of SLA violation due to underestimated resources. In summary, the second part can be used for automatic adaptation of the workload value predicted by any prediction algorithm with stationary prediction-error statistics, for the purpose of minimizing operation penalty-overhead.

In the context of this description, it is assumed that the amount of resources required is proportional to the workload. Consequently, the expressions workload prediction and resource requirement prediction are considered equivalent, and may be used interchangeably. The first part of the description is directed to a method for adjusting the forecast of the underlying workload (or equivalently, required resource level) prediction algorithms to achieve a target performance from the SLA perspective. The second part of the description describes methods that, using components of the first part, facilitate the optimization of the operational efficiency.

SLA Perspective

Service-level agreements define the performance commitment and obligations of a service provider to its customers. In this document, the service provider is considered to include entities such as: infrastructure providers that deliver servers along with management and scheduling functions; cloud computing providers (e.g. Amazon Web Services (AWS), Microsoft Azure) that provide virtualized infrastructure; cloud management/orchestration functions providers and service providers, whether they use their own infrastructure or a third-party cloud.

Service-level objectives span a large range of performance aspects—and associated Key Performance Indicators (KPI)—such as reliability, percentage of service completion (or failure), transmission delay, signaling delay, the volume of handled traffic, etc. In the context of this description, the aspects of service-level objectives considered are those that relate, directly or otherwise, to the ability to predict—and hence, provide in a timely manner—sufficient resources to fulfill the customers' time-varying requirements. A direct service-level objective could be formulated in terms of the percentage of instances when the forecast workload (and hence, the provided resources) is large enough to meet the real workload requirements. An example of an indirect KPI that can be translated onto workload prediction performance is the number of service failures/rejections caused by the failure of the workload prediction algorithm to forecast (and hence, provide) sufficient resource levels at a given time; this can be converted to a service-level objective such as a limit to the resource underestimation percentage. Therefore, in the subsequent text, references to service-level objectives (and SLAs) are in terms of successful prediction of a customer's resource requirements in the sense of making sufficient resources available to the customer. Accordingly, success in workload prediction is defined as forecasting workload values equal to or greater than the real workload; forecast values smaller than the real workload result in insufficient resources, which can cause failure to fulfill the service requirements, leading to potential violation of related SLAs (depending on the terms and thresholds defined by the SLAs).

The statistics of the underlying workload forecast algorithms are tracked and used to modify the forecast load in such a way as to produce a "success" rate corresponding to the service-level commitment.

Estimation of Statistics

Figure 3:
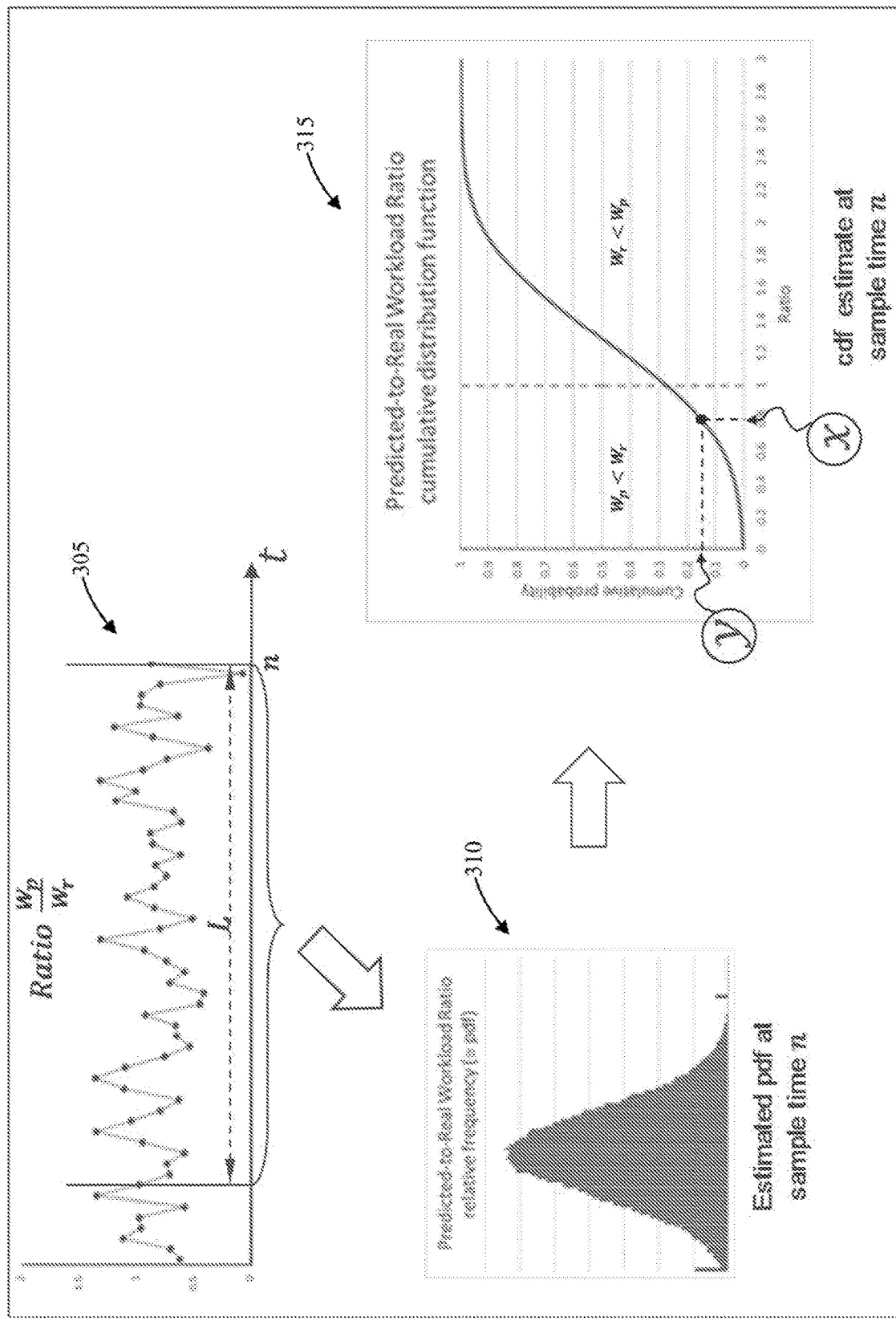
FIG. 3 is a diagram illustrating estimation of probability density function (pdf) and cumulative distribution function (cdf) of predicted to real workload ratio.

Defining $W_r(n)$ and $W_p(n)$ as the real and predicted workload values, respectively, the statistics of the ratio of the predicted workload to the real workload $$R(n) = \frac{W_p(n)}{W_r(n)}$$

are collected, where n is the discrete-time index. More specifically, the cumulative distribution function (cdf) of this ratio is estimated. There are many prescribed ways of estimating the cdf. Referring to FIG. 3, one example is to start with an estimate of the probability density function (pdf) of this ratio: the pdf is estimated using the most recent L values of the ratio R, as shown at the top of the figure, element 305. To do this, first an appropriate range corresponding to the possible range of values that R can take is selected. Given the definition of R, the lower end of the range is limited by zero, since the predicted workload ($W_p$) cannot be less than zero. The upper bound of the range has no theoretical limit and should be selected based on practical considerations. The selected range is divided into a number of bins (designated here as $N_b$), each representing a narrow range of values within the overall range of the pdf, with a center value of $x_k(n)$, where k is the bin index and n is the discrete-time index. The bins are used to count the number of times that the value of R happens to fall within the range of each of the bins. As such, the pdf at time n is formed by selecting, for each of the last L values of R, the bin whose range is closest, and incrementing the bin value by $$\frac{1}{L}.$$

This results in a scaled histogram $pdf_n(k)$, representing the (scaled) relative frequency of different possible values of the ratio R. This is shown in the lower left side of FIG. 3, element 310. For a workload prediction algorithm that has stationary prediction-error characteristics for the window size of L samples, the scaled relative frequency, calculated as described, can be used as an estimate of its probability density function. Next, the estimated value at time n of the corresponding $N_b$ cdf bins is obtained, by definition, as:

$$cdf_n(k) = \sum_{i=0}^{k} pdf_n(i), 0 \le k < N_b$$

In the cdf expression above, n is the discrete-time index and k is the bin index. The plot of an estimated cdf of the ratio R is shown in the lower right-hand corner of FIG. 3, element 315. The bins mentioned above form the horizontal axis. The vertical axis represents cumulative probabilities: a point on the cdf (n) with coordinates (x, y) indicates that at time n the probability of the ratio $$R(n) = \frac{W_p(n)}{W_r(n)}$$

being less than x is y.

For example, referring to the cdf plot of FIG. 3, element 315, the highlighted point indicates that for the specific workload profile and the specific workload forecasting algorithm that was used to produce the plotted cdf, the probability of the ratio $$\frac{W_p(n)}{W_r(n)}$$

being less than 0.8 is about 15%, or equivalently, the probability of the ratio being greater than 0.8 is about 85%.

Scaling of Forecast Workload

Figure 4:
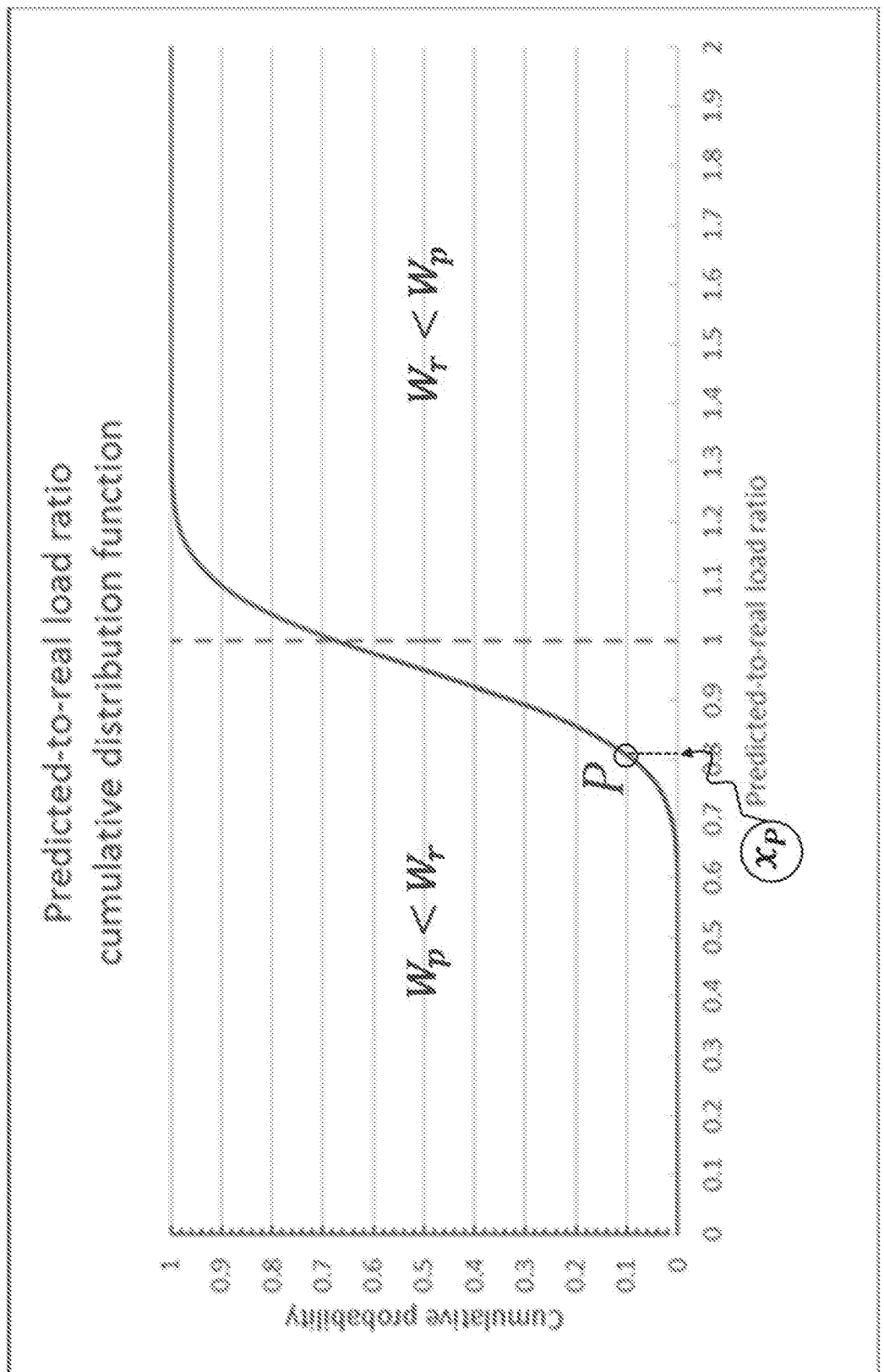
FIG. 4 is a diagram illustrating unadjusted cdf.

FIG. 4 shows the cdf for a predicted-to-real workload ratio. The dashed vertical line crossing the horizontal axis at point 1 intersects the cdf where the predicted workload is equal to the real workload. The part of the cdf on this line and to its right represent predicted workload values that are equal to or greater than the real workload, which results in the delivery of sufficient resources for the job. For the example shown in FIG. 4, the probability of delivering the customer requirement is seen to be about 32%; said differently the probability of not delivering the customer requirement is about 68%. This, however, reflects the performance of the workload forecast algorithm, and may not necessarily correspond to the required service-level.

Let's now consider a service-level commitment of 90%, meaning that the customer is promised to be provided sufficient resources with a probability of 90%, which corresponds to the point P on the cdf plot of FIG. 4 at the cumulative probability value of 10%. For such an SLA to be fulfilled, the point at which the plotted cdf corresponds to the cumulative probability of 10% would have to fall on the dashed vertical line, or to its right. This point, marked with the circle labeled P on the figure, falls short of the requirement.

The proposed solution is to adjust the workload forecast value by scaling it with a multiplicative factor that will cause a shift of the resultant cdf curve in such a way as to move the point P to the dashed vertical line (or to its right). Such a scale-factor, called $\alpha(n)$, can be computed as:

$$\alpha(n) = \frac{T}{x_P(n)}$$

where n is the discrete-time index, T is the target predicted-to-real workload ratio (i.e. 1), and $x_P(n)$ (the center value of the cdf bin whose content is closest to 10%) is used as the approximation of the horizontal coordinate of the point P. Given that T=1, and $x_p(n) \approx 0.8$ in the example shown in FIG. 4, the scale-factor would be calculated as:

$$\alpha(n) = \frac{1}{0.8} = 1.25$$

Figure 5:
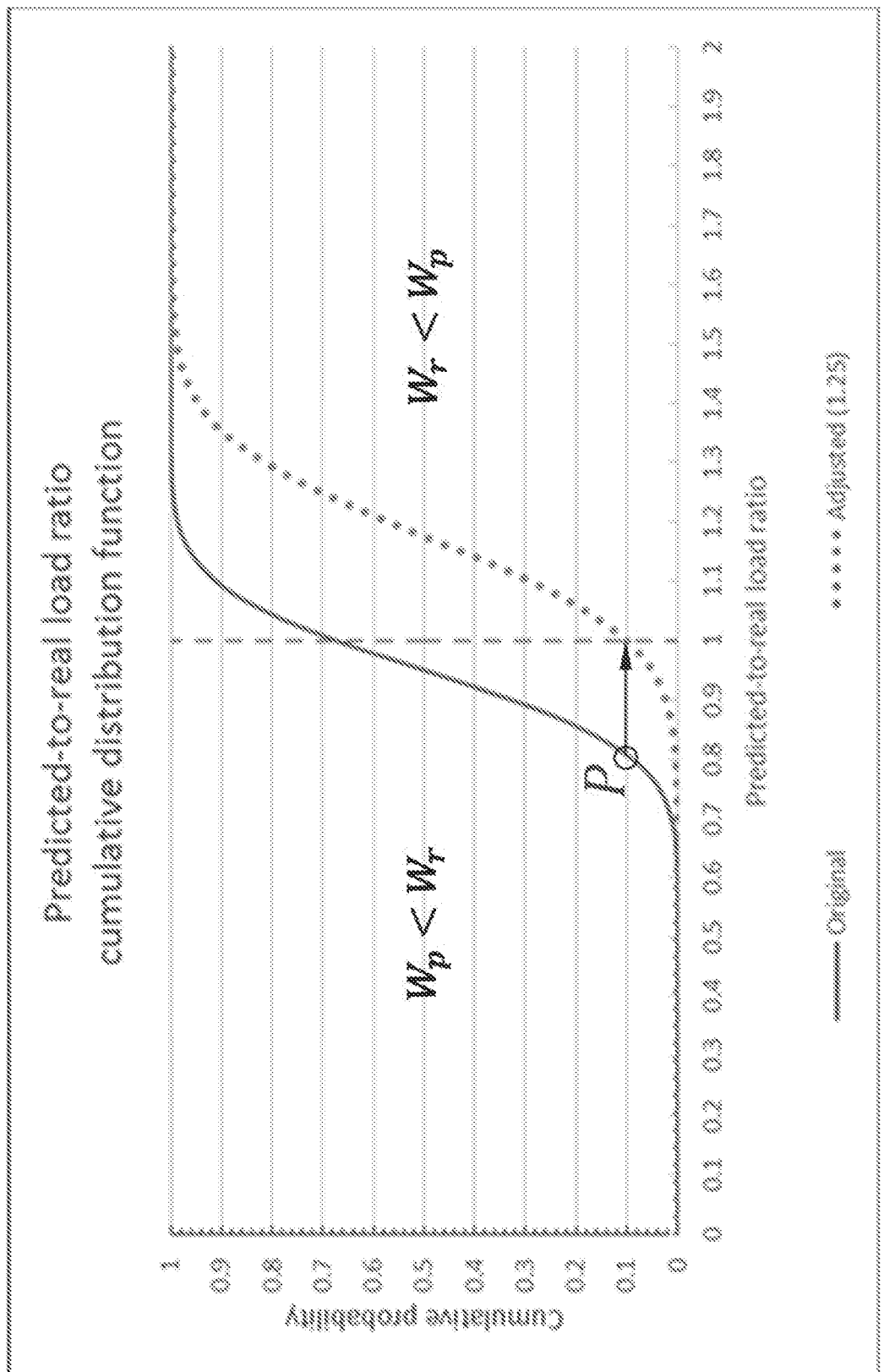
FIG. 5 is a diagram illustrating adjusted cdf.

For a workload prediction algorithm with reasonably stationary prediction-error statistics, this value results in a cdf with the point P shifted onto the dashed vertical line, as shown in FIG. 5, where the dotted curve is the cdf obtained after the application of the scale-factor. A larger scale-factor will shift the point P further to the right of the dashed line.

In the example above, the value of the target ratio (T) is assumed to be 1, reflecting the popular formulation for SLAs, i.e. in the form of a certain probability of providing a "full" service. However, it is also possible to consider a somewhat different form of SLA, such as committing to provide x % (rather than the customary 100%) of the required resources, with a probability of at least y %.

For example, a service provider could commit to providing at least 80% (rather than 100%) of a customer's required resources, with a probability of, for example, at least 97%. This type of SLA would allow a service provider the flexibility to offer different tiers of service. In doing so, the resources could be over-assigned (the resources are assigned or reserved in excess of the real availability) for increased utilization rates (hence greater efficiency) at the risk of occasional SLA failures. The target ratio can also be set to a value greater than 1, in order to provide explicit padding for critical cases where underestimation may be particularly undesirable.

In summary, the scale-factor is calculated as follows: the cdf array is scanned to find the element whose value is the closest match to the target probability P, and its corresponding bin center value ($x_p$) is noted. Next, the scale-factor is calculated by dividing the target predicted-to-real workload ratio (T) by $x_p$.

If the underlying workload prediction algorithm happens to produce the desired outcome to meet the SLA requirements, this would mean that the value of $x_p$ is equal to the target predicted-to-real workload ratio (T). If so, the value of the scale-factor defined here will become 1, meaning that the proposed solution will not degrade the performance of the underlying workload prediction algorithm. If the underlying workload prediction algorithm is too conservative, i.e. its predicted workload is higher than the real workload at the target probability, then the scale-factor will have a value less than 1, reducing the amount of overestimated workload/resources, hence resulting in a lower operation penalty-overhead.

Figure 6:
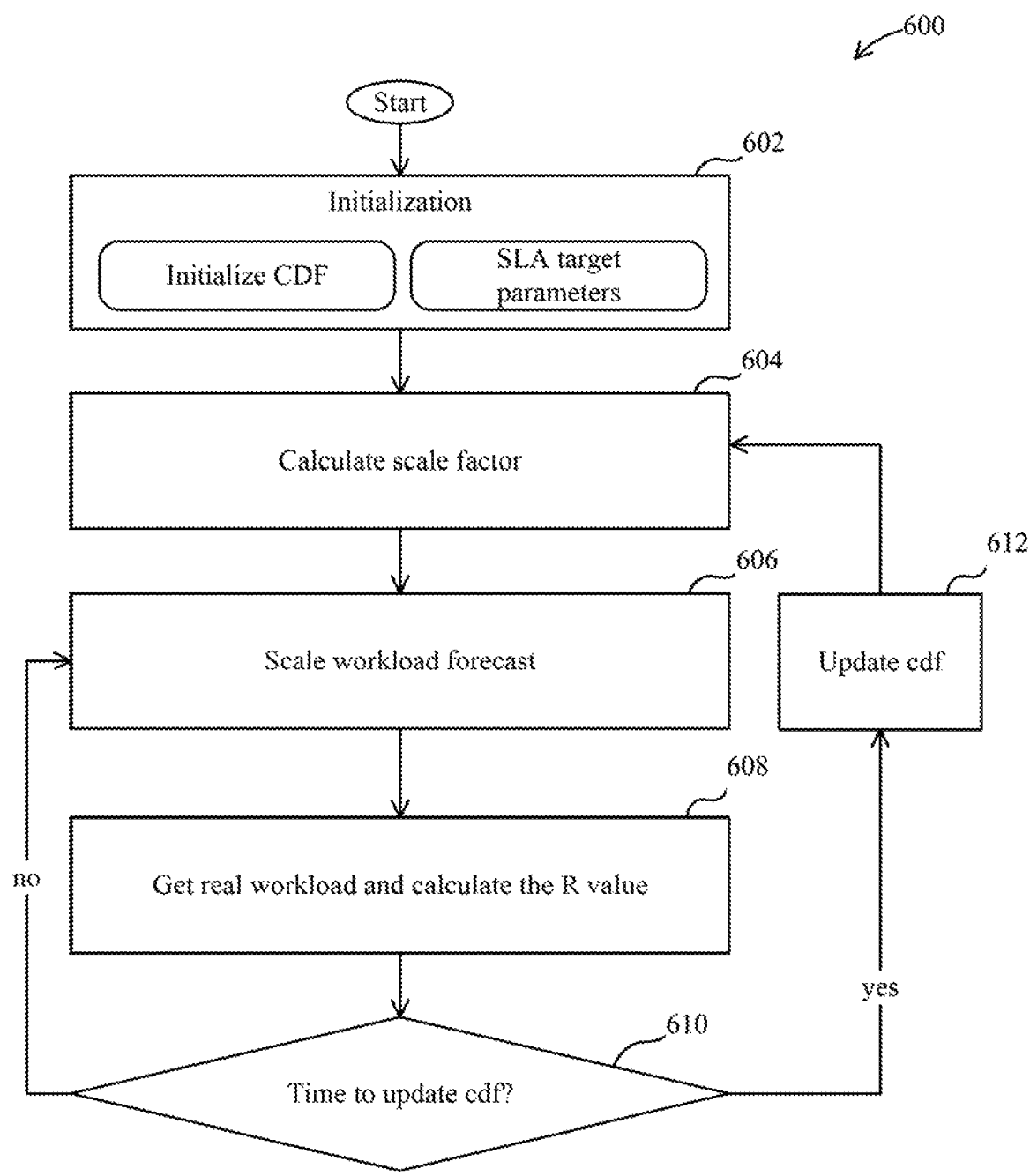
FIG. 6 is a flowchart of a method for SLA compliance according to an embodiment.

An embodiment in which a method 600 for adjusting workload forecast values based on target SLA parameters is described in relation with the flowchart of FIG. 6. In step 602, initialization, the initial model of the cumulative distribution function is obtained. This can be done in a number of ways. One way is to wait for the first L samples of real and predicted workload values, after which the cdf can be estimated as described previously. Another possibility is to retrieve a pre-stored value of the cdf function. The SLA parameters (described in the section with the title "Scaling of forecast workload"), i.e. the target predicted-to-real workload ratio (T), and the service-level commitment value (P), are defined in accordance with the governing SLA.

In the next step 604, the appropriate scale-factor is calculated using the current cdf model and based on SLA target parameters T and P.

The workload forecast for the next time instance, obtained from the underlying workload prediction algorithm, is multiplied by the scale-factor at step 606, and the resulting adjusted prediction is used to determine the amount of resources to be made available to a given service.

Next, at step 608, the real workload value for the next time instance is obtained and the corresponding predicted-to-real workload ratio (R) is calculated.

At step 610, a decision is made on whether the cdf should be updated. Best results are expected when the cdf is updated for every new workload sample and the corresponding R. However, computational complexity (and hence, computational load) can be reduced by updating the cdf, step 612, at a lower frequency (using stored R values). If the cdf is not due for update, then the scale-factor should not be recomputed either. If the cdf is updated, then the scale-factor should also be computed based on the fresh cdf estimate.

The parameters, such as the pdf/cdf range, the length of the window over which the cdf is estimated (L), and the number of pdf/cdf bins ($N_b$) should be selected judiciously for optimal results, i.e. the correct balance between effectiveness and memory/computational power efficiency.

For example, the cdf estimation window (L) should be large enough such that the cdf remains reasonably stationary (i.e. it should vary very slowly from a time instance to the next), and yet small enough to contain memory and computational requirements.

The number of bins ($N_b$) should be large enough to provide sufficient granularity. However, a needlessly large value would waste memory and computational resources.

The pdf/cdf range can be adapted dynamically; the effectiveness of the method depends on the segment of the cdf around the point identified as $x_p$. Therefore, it is possible to limit the covered range to a region around that value, using enough bins as to allow gradual adaptation to follow changes in the value of $x_p$, while reducing the range of the individual bins and thus increasing accuracy. The reduced range also helps to reduce the number of bins, thereby reducing memory and computational power requirements.

The cdf estimation does not necessarily require the explicit estimation of the pdf. Rather, it could be done incrementally in order to minimize computational requirements.

Penalty-Overhead Optimization Perspective

Prediction of resource requirements (either directly, or indirectly through the prediction of the workload) naturally results in errors of overestimation and underestimation. Both types of errors incur penalty-overhead: overestimation causes needless allocation of resources and unnecessary power consumption while underestimation potentially gives rise to penalties when service-level agreements are violated. Presumably, workload (or resource requirement) prediction algorithms are intended to strike a balance between the two types of errors, but in general they are not designed for dynamic optimization. It may seem logical that meeting (but not exceeding) the service-level objectives should provide the lowest total operational penalty-overhead. However, the analysis of public SLAs shows that this is not necessarily the case; the SLA violation penalties vary among different service providers even for identical services and the same service-level objectives. Furthermore, a service provider may have different customer tiers for the same service, each with their own (and different) SLA violation penalty structures.

Another aspect will now be described, and concerns a method for dynamic optimization of penalty-overhead of underestimation and overestimation by adjusting the workload forecast produced by an underlying prediction algorithm using an approach based on the multiplicative scale-factor described previously.

Prediction-Error Penalty-Overhead Characteristics

The total penalty-overhead of errors in prediction of the resource requirements has two components that are incurred differently:

The overhead of overestimation relates to the waste or inefficiency incurred by allocating and running a resource that is not used. It is accrued immediately, and goes up directly in proportion to the amount by which the estimate exceeds the amount of required resources.

The penalty, to a service provider, of underestimation depends on the terms of the governing SLA. Typical SLAs commit to providing the desired service for at least a certain percentage of time over a fixed time interval, referred to as the "accounting period" in this description. This implies that it is possible to fall short of the committed service level without necessarily incurring any penalty; penalty applies only if, at the end of a predetermined time period, the total amount of service shortcoming exceeds the limit spelled out in the SLA. The penalty itself can vary with individual SLAs, and it could range from a fixed penalty (typically larger than the value of lost service), to one whose magnitude is proportional to the service shortage.

The total penalty-overhead of prediction errors can be determined at the end of each predetermined time period, at which time it is possible to assess the amount of underestimation penalty as well as the overhead of unused resources (due to overestimation) over the same period. The penalty-overhead determination can be carried out using a penalty-overhead function that takes as input the amounts of resource overestimation and underestimation, calculates the overhead of overestimated resources based on applicable parameters, and adds the penalty of underestimation based on the penalty-overhead model specified in the SLA.

Figure 7:
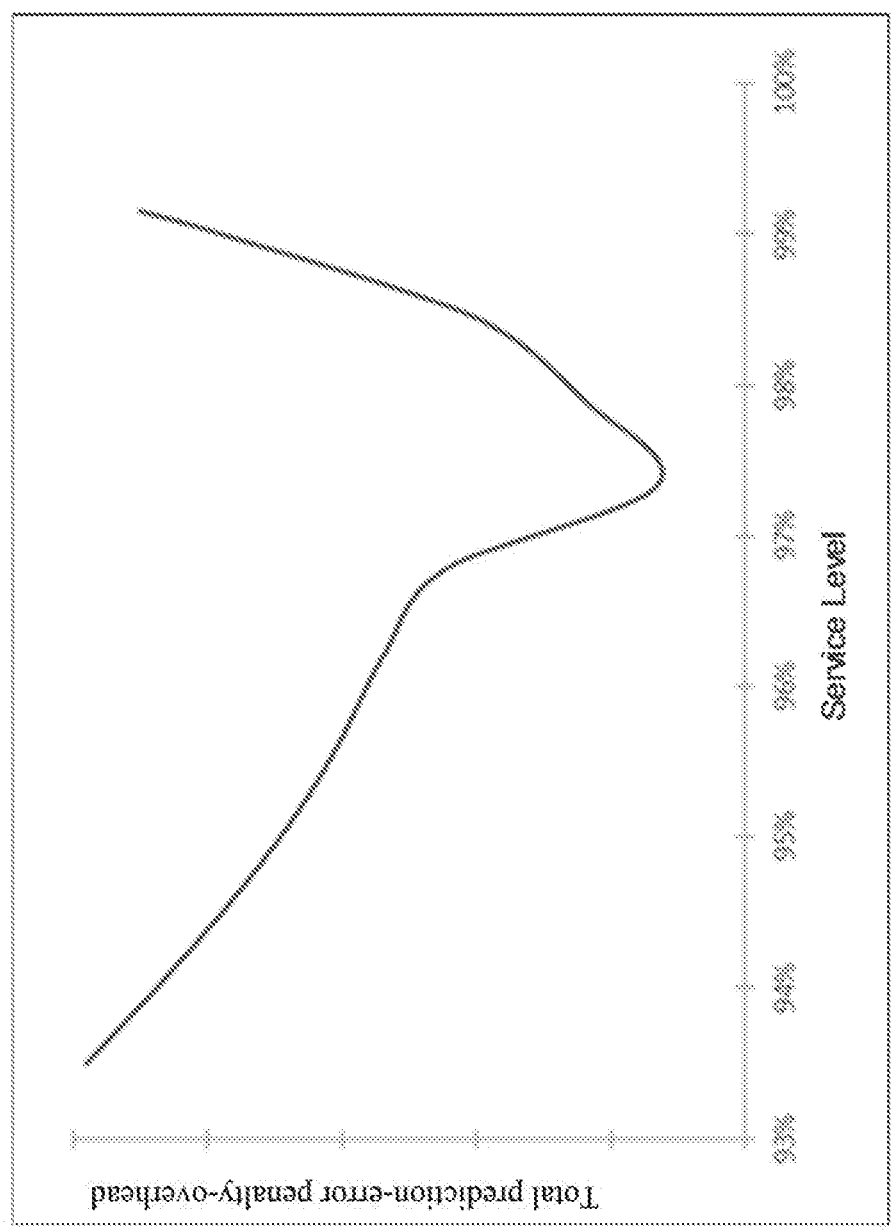
FIG. 7 is a diagram illustrating prediction-error penalty-overhead as a function of service level.

It is expected that a well-structured service-level agreement will give rise to prediction-error penalty-overhead that form a convex curve when plotted as a function of service-level. FIG. 7 depicts an example of the prediction-error penalty-overhead based on a service-level agreement whose violation penalty is defined to be proportional to the total amount of underestimated workload/resources. The total of penalty and overhead due to prediction error is high where the service level is far below the target; in this region the probability of overestimation (and the associate overhead) is low, the SLA violation penalty is the dominant factor in the penalty-overhead, and it increases with reduced service level. As the service level increases, the underestimation penalty charges become smaller and so the total penalty-overhead drops. As performance approaches the target service level, the rate of service-level commitment failure drops, accelerating the drop in the penalty, and hence, the total of penalty and overhead. Beyond the target service level, the total of penalty and overhead once again resumes upwards because of the increase in the amount of unused resources and the commensurate overhead.

Dynamic Tracking of the Lowest Penalty-Overhead Service Level

Figure 8:
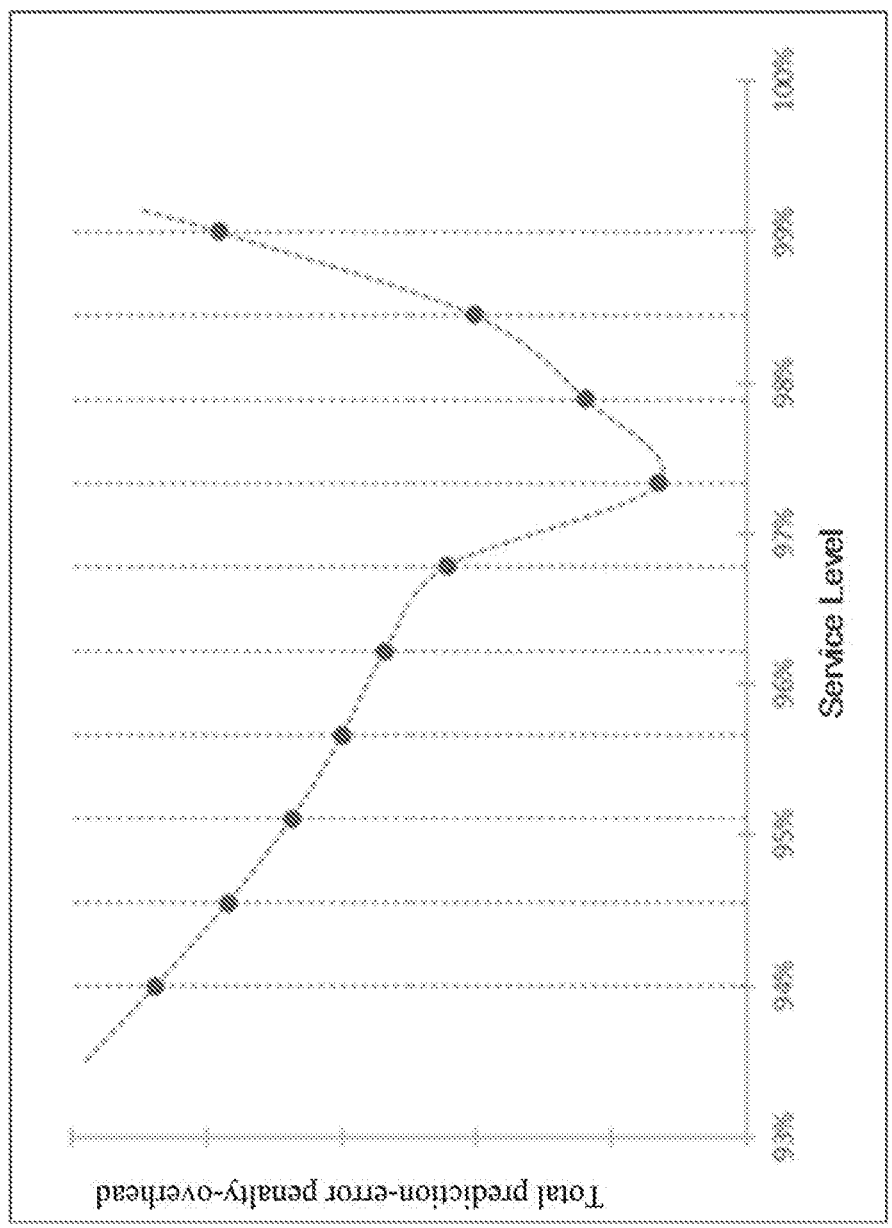
FIG. 8 is a diagram illustrating the evaluation of prediction-error penalty-overhead samples at different service levels.

The proposed approach for dynamic optimization of the prediction-error penalty-overhead takes advantage of the convex characteristics of the penalty-overhead as a function of the service level, using the mechanism described previously: the prediction-error penalty-overhead is evaluated for a number of different service levels, and the scale-factor computed for the service-level corresponding to the lowest overall penalty-overhead is used to scale the forecast of the underlying workload prediction algorithm. An example of such a procedure is shown in FIG. 8, where a number of service levels are selected for evaluation, preferably around the target of the SLA. In the example of FIG. 8, ten service levels are evaluated, spread evenly in the range of [94%, 99%]. Respective scale-factors for each of the 10 service levels are obtained using the method described in the section under the title "SLA perspective". A revised workload forecast is calculated for each service level, as follows:

$$W'_{p_k}(n) = W_p(n) * a_k(n), 0 \leq k < N_g$$

where $N_g$ is the number of grid points for evaluation of the prediction error (10, in this example), k is the index identifying the specific service level, n is the discrete-time index, $a_k$ is the scale-factor calculated (using the method described under the title, "SLA perspective") for the $k^{th}$ service level, $W_p$ is the workload forecast by the underlying prediction algorithm and $W'_{p_k}$ is the adjusted workload forecast for the $k^{th}$ service level.

Then, once a new real workload value ($W_r$) is obtained, the cumulative overestimation/underestimation errors ($E_{o_k}$ and $E_{u_k}$, respectively), which are reset to zero at the start of the procedure, are updated as follows:

$$E_{o_k}(n) = \begin{cases} E_{o_k}(n-1) + W'_{p_k}(n) - W_r(n), & W_r(n) < W'_{p_k}(n) \\ E_{o_k}(n-1), & W'_{p_k}(n) \leq W_r(n) \end{cases}$$

$$E_{u_k}(n) = \begin{cases} E_{u_k}(n-1) + W_r(n) - W'_{p_k}(n), & W'_{p_k}(n) < W_r(n) \\ E_{u_k}(n-1), & W_r(n) \leq W'_{p_k}(n) \end{cases}$$

This procedure goes on for an interval of time whose length is the predetermined time period. At the end of the predetermined time period the overestimation/underestimation error components for each of the selected service levels are applied to the governing penalty-overhead function to obtain the total prediction-error penalty-overhead. The service level that yields the lowest total penalty-overhead is selected as the target for the adjustment of the forecast delivered by the underlying workload prediction algorithm (using the method described under the title, "SLA perspective") until the next selection instance.

Figure 9:
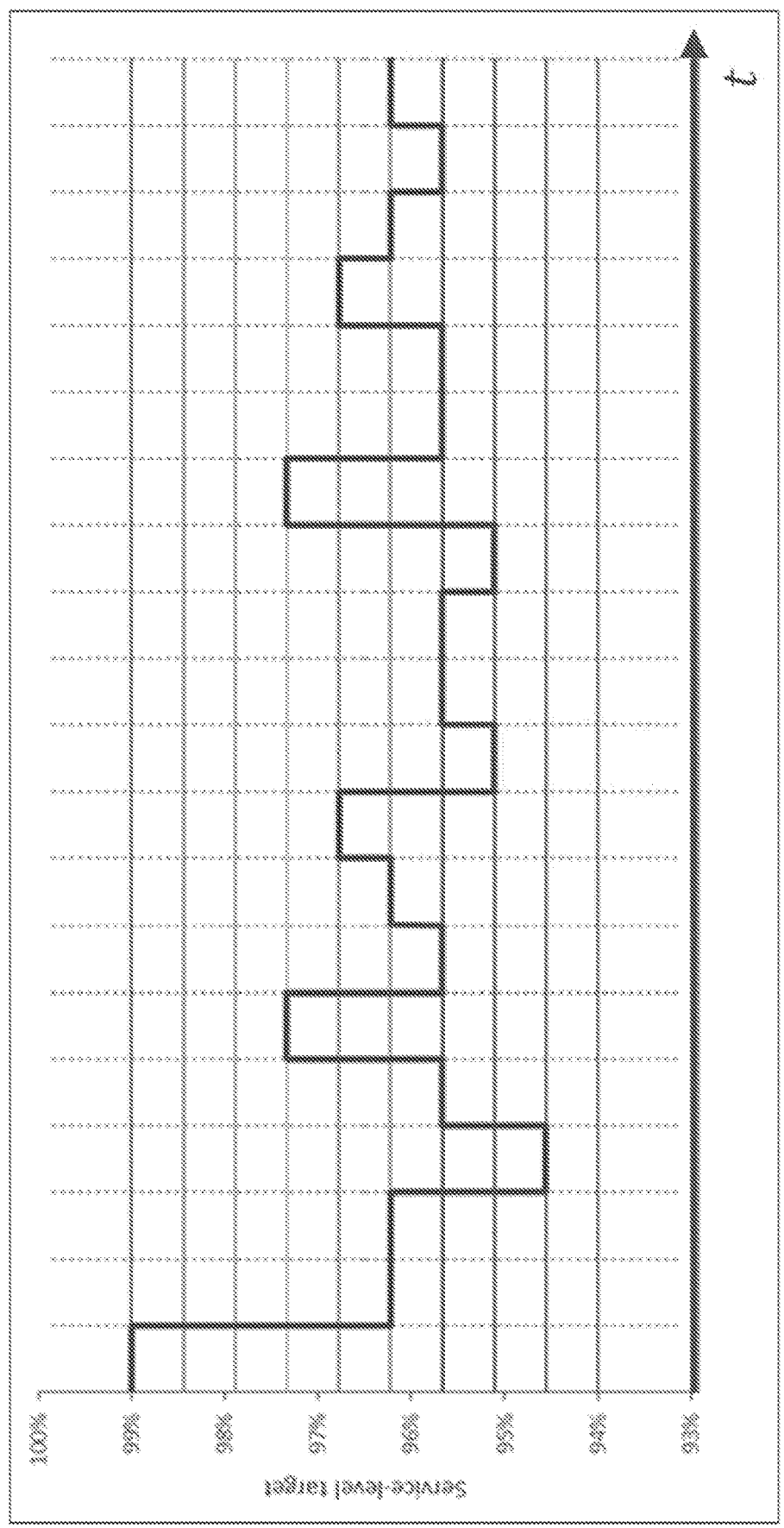
FIG. 9 is a diagram illustrating the trajectory of lowest penalty-overhead service level.

FIG. 9 shows an example of the selection, over time, of the service level with the lowest total penalty-overhead. The straight horizontal lines correspond to the 10 service levels used to search for the lowest penalty-overhead option. The dotted vertical lines mark the intervals corresponding to the predetermined time periods. The procedure described above, started at the beginning of each predetermined time period, runs until the end of the period at which time the service level that yielded the lowest total penalty-overhead is selected as the target for dynamic prediction adjustment over the next predetermined time period. The heavyset line corresponds to the selected service level as it evolves with time.

In the example above the selection process was shown to occur once every predetermined time period. However, it is possible to run the procedure at a higher rate (as high as once for every new real workload data), using a sliding window whose length is the predetermined time period. In doing so, better performance (due to more frequent updates) can be traded off against complexity/computational load.

Dynamic Adjustment of Tracked Service Levels

The search procedure for the service level corresponding to the lowest total operational penalty-overhead that was described in the section under the title "Dynamic tracking of the lowest penalty-overhead service level" evaluates the penalty-overhead of prediction errors at a fixed set of service levels, and selects the one among them that produces the lowest total penalty-overhead. As seen in FIG. 8, this is equivalent to obtaining samples of the prediction-error penalty-overhead function (the dotted curve), and selecting the sample closest to the minimum. While this approach may yield satisfactory results in some cases, it may not necessarily yield the lowest possible penalty-overhead. Furthermore, depending on the number of service levels in the set, and the region that they cover, it is possible to miss the lowest penalty-overhead by a large margin, e.g. in cases where the lowest-penalty-overhead service level may have shifted outside the covered range. This can be avoided through the dynamic selection of service levels at which the prediction error penalty-overhead are evaluated. The convex characteristic of the penalty-overhead curve facilitates the search; this type of problem has been treated in a number of different contexts. A simple approach is provided here as an example.

Figure 10:
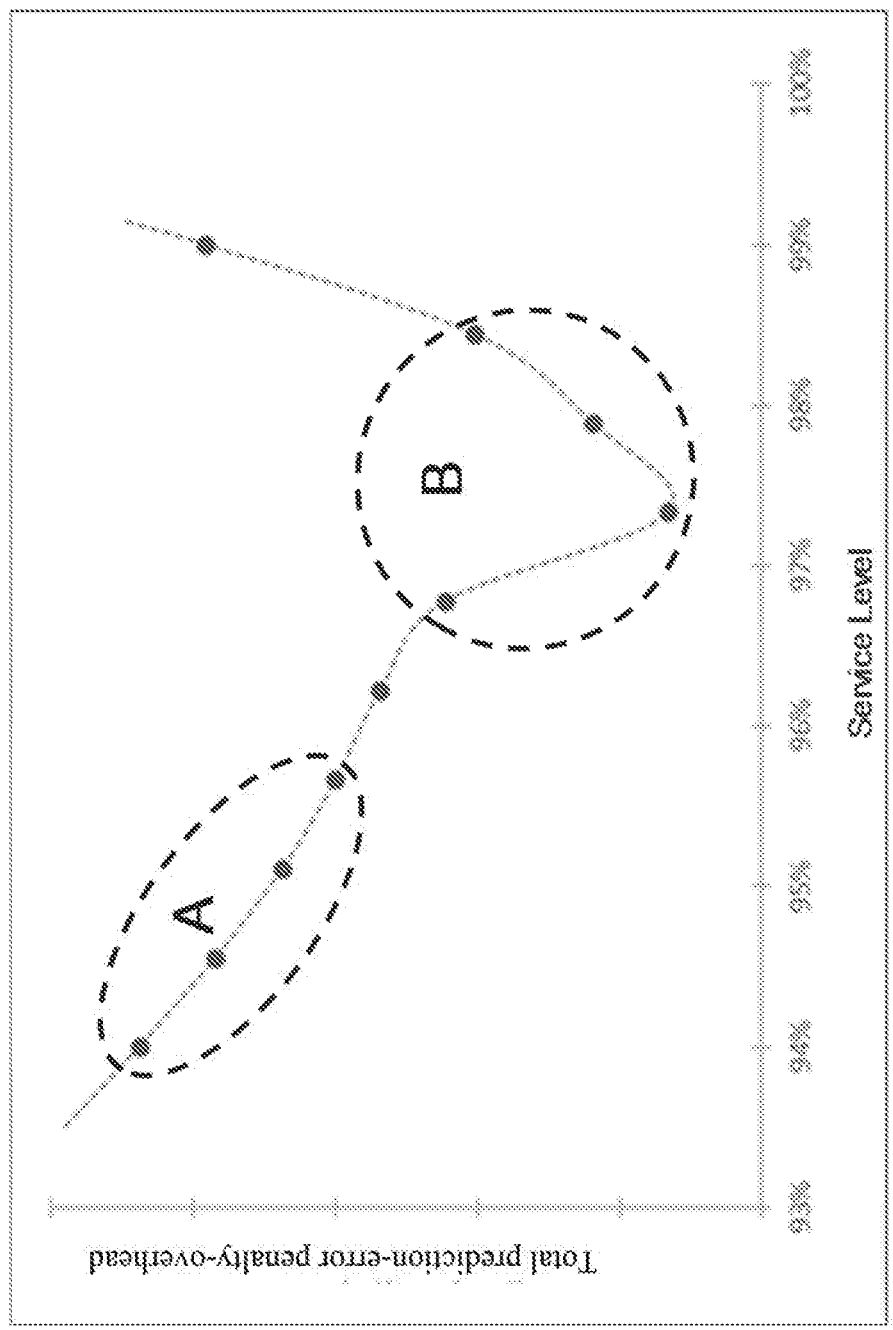
FIG. 10 is a diagram illustrating the prediction-error penalty-overhead for two groups of samples.

The approach described here evaluates a fixed number (4, in the case of this example) of service levels whose values are changed over time in a dynamic search for the service level corresponding to the lowest total penalty-overhead. At the start of the procedure a range is chosen, and a fixed number of service levels are assigned (preferably distributed evenly over the selected range) to evaluate prediction-error penalty-overhead in this range. FIG. 10 shows the two general types of shapes that can be expected when sampling a convex curve: a monotonically increasing/decreasing segment (group A, where the point of minimum value is at one of the two ends of the range), or a convex segment (group B, where the point of minimum value may be anywhere except at the two ends of the range). Once the prediction-error penalty-overhead is evaluated for a group of service levels, the steps that are taken depend on the shape of the segment, and are described below.

Monotonically Increasing/Decreasing Segment

Figure 11:
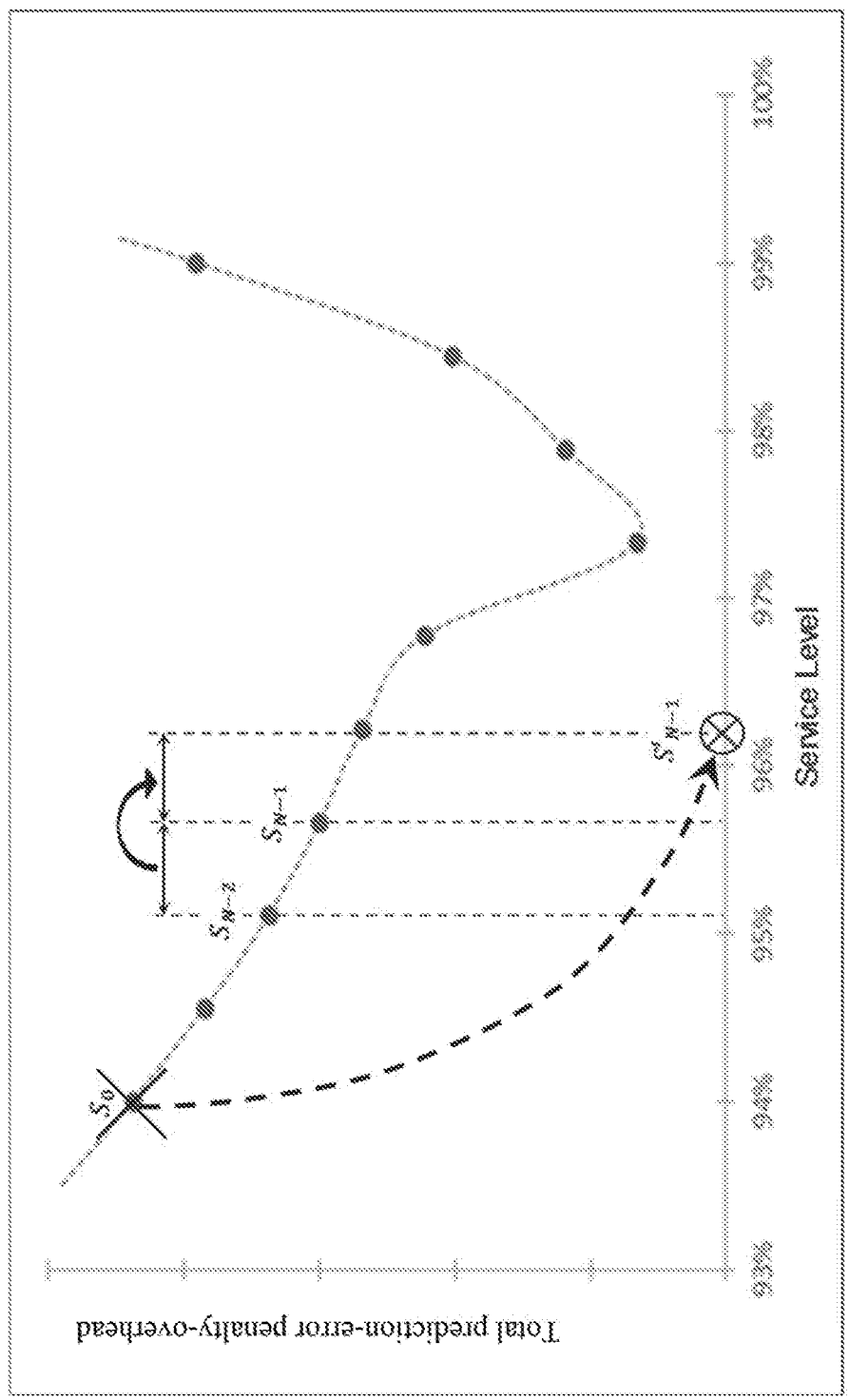
FIG. 11 is a diagram illustrating the progression of monotonically increasing/decreasing segment.

In this case it is possible that the decreasing trend of the segment may continue, leading towards a service level with a yet lower prediction-error penalty-overhead. Therefore, the chosen strategy is to replace the service level in the set that produced the highest penalty-overhead, with a new one that is assigned somewhere beyond the service level in the set that yielded the lowest penalty-overhead. This is demonstrated in FIG. 11 where the service levels in the set are labeled $S_0$ through $S_{N-1}$, where N is the number of service levels in the set (4 in the case of this example). As shown in FIG. 11, the highest-penalty-overhead service level ($S_0$) is removed from the set, and a new one ($S'_{N-1}$) is added. The latter is positioned in such a way as to have the same distance from $S_{N-1}$ that $S_{N-2}$ has from $S_{N-1}$. Other ratios could be used as well. Indeed, the new point may need to have a smaller distance from $S_{N-1}$ to remain within the service level bounds of 0% and 100%.

Convex Segment

Figure 12:
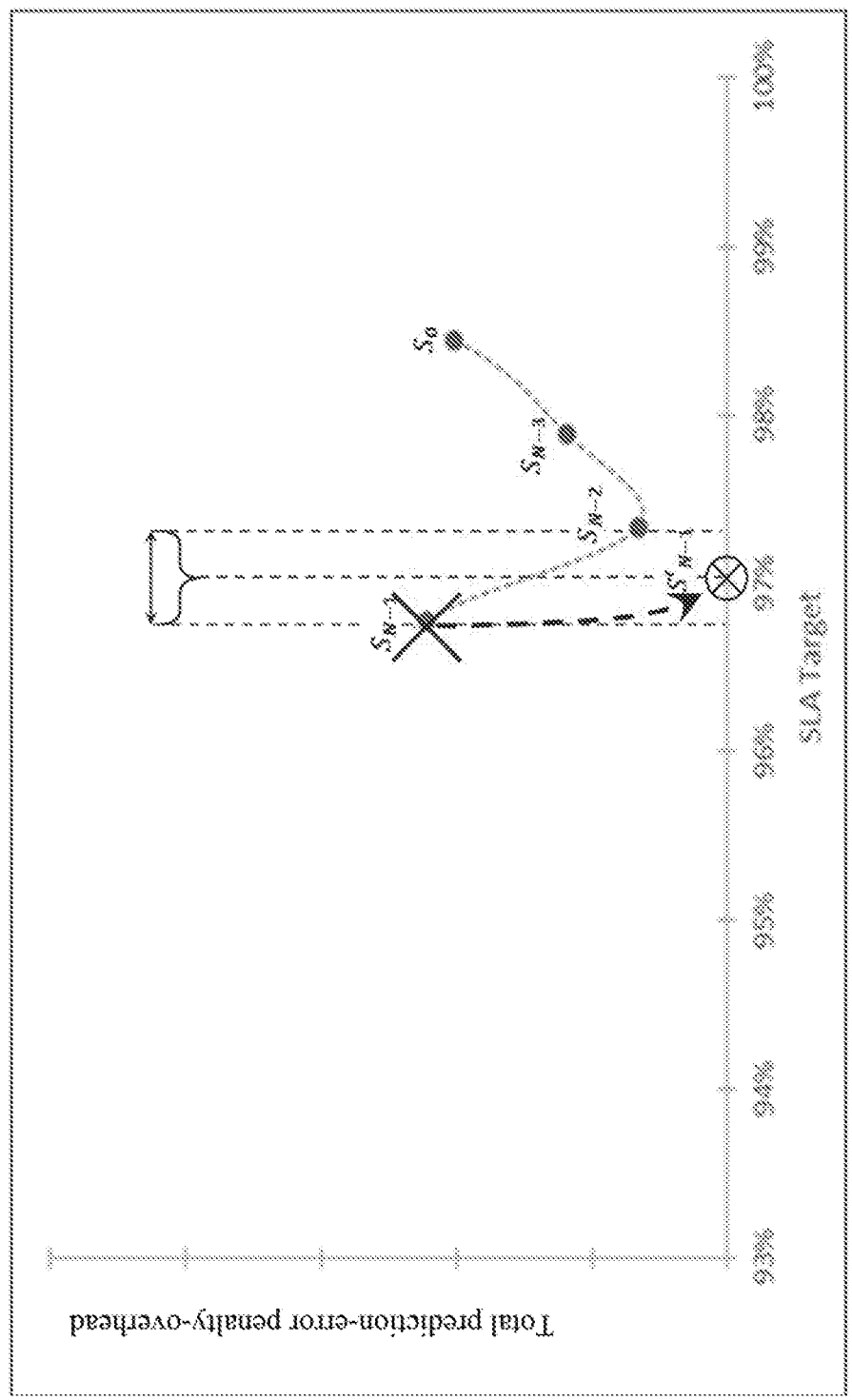
FIG. 12 is a diagram illustrating progression of convex segment.

This case is demonstrated in FIG. 12. Once again, a new service level is added to the set ($S'_{N-1}$), but this time it is placed between the lowest penalty-overhead service level ($S_{N-2}$ in the case of this example) and the one from its two adjacent points with the higher penalty-overhead ($S_{N-1}$ in this example). As shown in FIG. 12, the new service level is selected to be in the middle of the two. However, a different ratio could be selected. Finally, in order to retain the same number of service levels in the set, the one with the highest penalty-overhead, which happens to be $S_{N-1}$ in this example, is removed from the set.

Imposing a Minimum Distance

The dynamic adaptation of the service levels in the set, in the search for minimum prediction-error penalty-overhead, eventually hits the convex part of the curve, with every iteration reducing the distance between the service levels in the set. In order to avoid the convergence of the values of the service levels in the set, a minimum distance is imposed. To do so, the newly introduced service level ($S'_{N-1}$ in both types of segments) is selected as the anchor point. Next, the distance between the anchor point and the next lower service level is checked against the minimum value, and if the distance is too short, the value of the lower service level is set to the value of the anchor point minus the minimum distance. This procedure is continued iteratively towards the next lower service level until all service levels lower than the anchor point are treated. Finally, the same procedure is repeated for service levels higher than the anchor point. The procedure, once completed, assures that adjacent service levels are separated by at least the minimum value.

Figure 13:
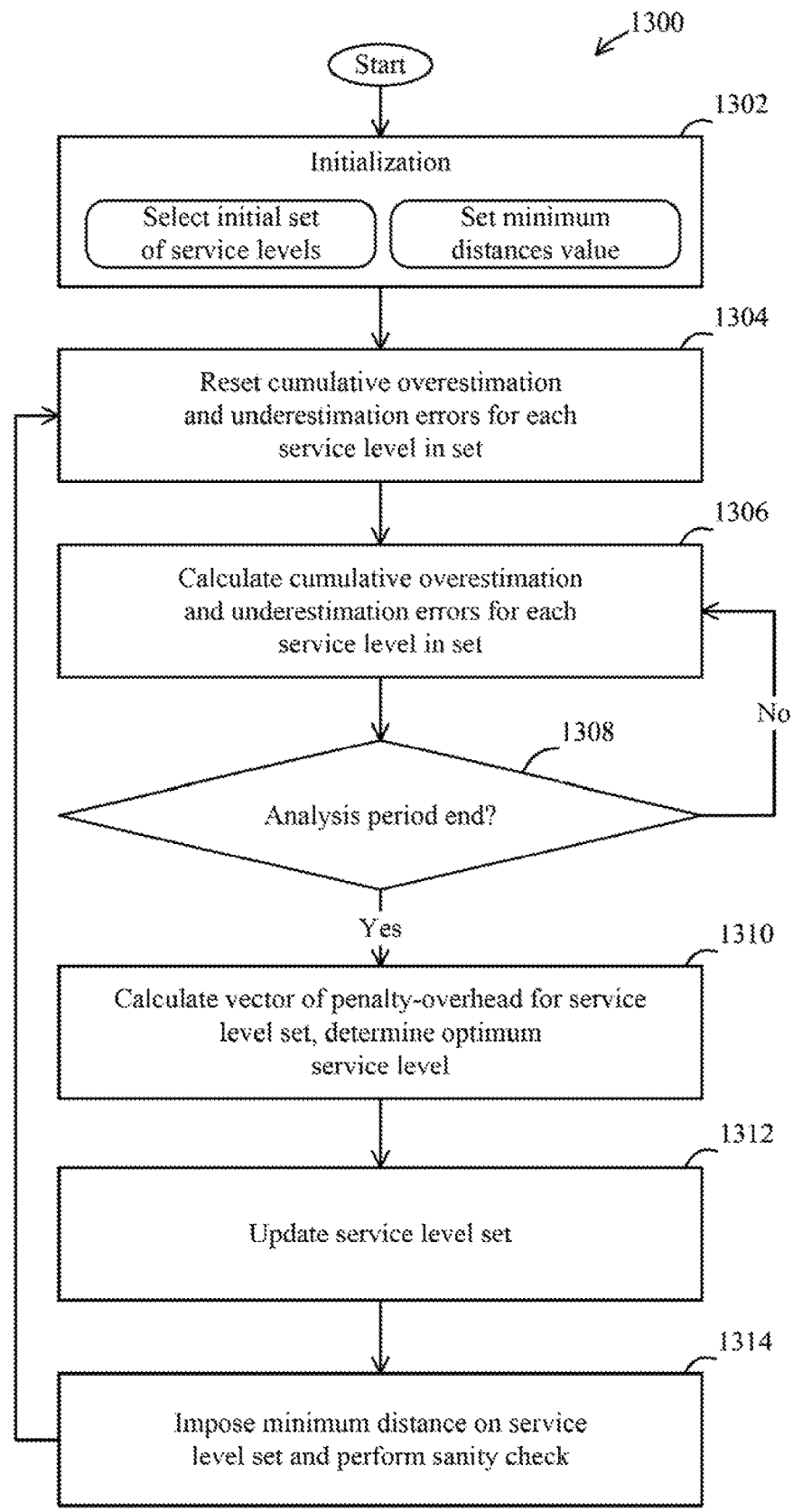
FIG. 13 is flowchart of a method for penalty-overhead optimization.

FIG. 13 presents an embodiment in which the previously described method 1300 is illustrated. In step 1302, initialization, a set of N service levels is initially distributed over an initial range of service levels. The order of the set (N) determines the trade-off between the speed of convergence versus computational load. The range can be selected arbitrarily, but it may be advantageous to center it around the value of the SLA target. The minimum distance between adjacent service level values is set as a parameter. Counters for cumulative overestimation and underestimation are reset to zero at step 1304.

As new real workload data points come in, the cumulative amounts of overestimation and underestimation are updated for each of the service levels in the set, step 1306. This continues until the analysis period is over, step 1308.

Once the analysis period is completed, the prediction-error penalty-overhead is calculated for each of the service levels in the set, step 1310 using the cumulative amounts of overestimation and underestimation, and based on the penalty-overhead function defined in the SLA. The optimum service level is determined and is used as the target for the next period.

Next, the set of service levels is updated, step 1312, as follows: if the lowest penalty-overhead service level is either the smallest or the largest in the set, then the procedure for monotonically increasing/decreasing segment (using the method described under the title "Monotonically increasing/decreasing segment") is used to add a new service level to the set. Otherwise, the procedure for convex segment (using the method described under the title, "Convex segment") is used.

The highest penalty-overhead service level is removed from the set. The new set of service levels is adjusted to impose the minimum separation between adjacent service levels. A sanity check is performed to make sure that all the service levels in the set are within the bounds of 0% and 100%, step 1314. The procedure starts over from the point of resetting the cumulative overestimation and underestimation amounts for each of the service levels in the set, step 1304.

Figure 14:
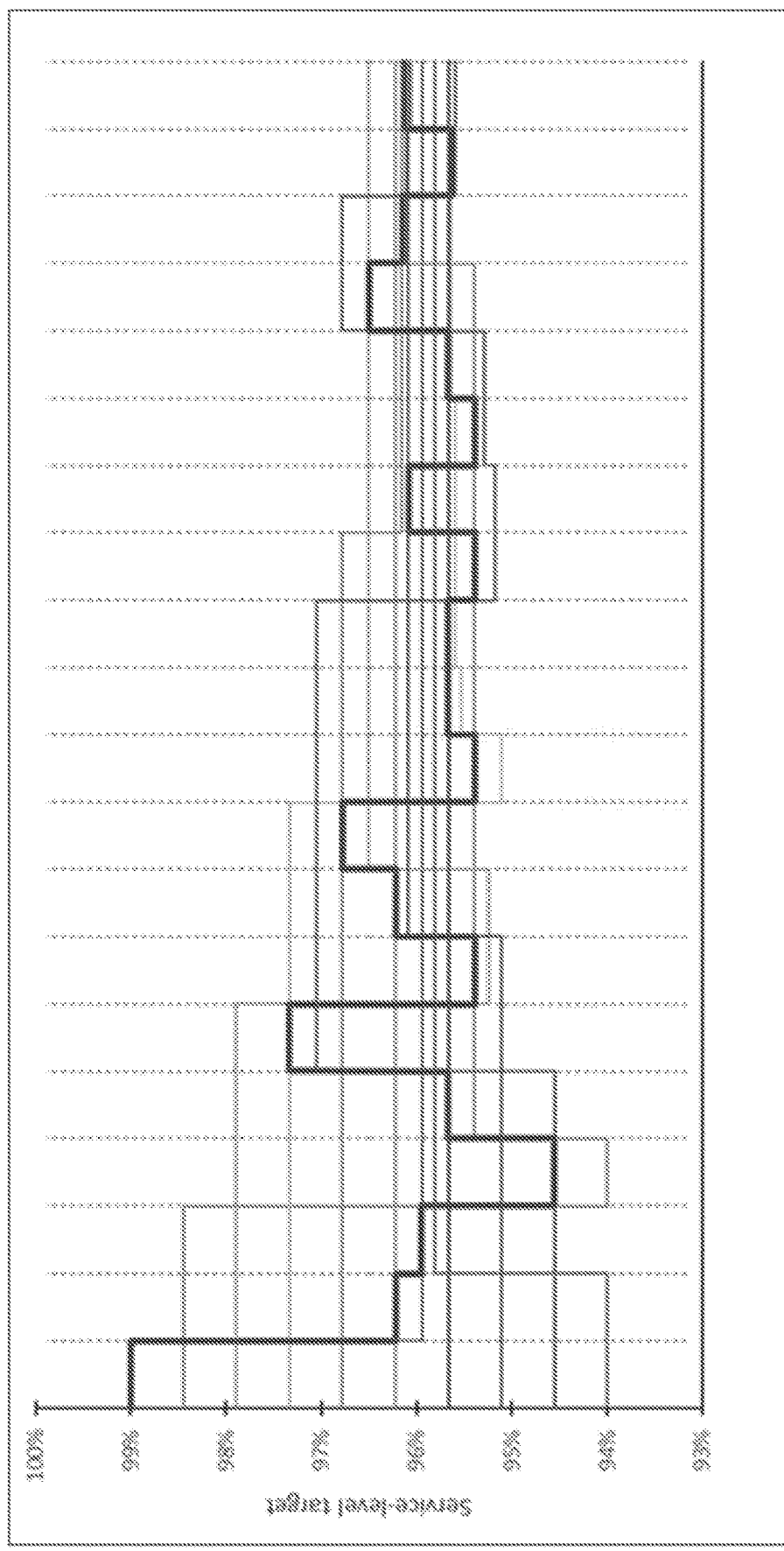
FIG. 14 is a diagram illustrating the trajectory of lowest penalty-overhead service level in a dynamically adjusted service level set.

FIG. 14 shows an example of the application of the method described in relation with FIG. 13, using a set of 10 service levels, demonstrating the convergence of the set towards the point of minimum penalty-overhead. The dashed vertical lines represent consecutive analysis/predetermined time periods. The heavyset line depicts the service level that was selected after each analysis/predetermined time period based on the lowest-penalty-overhead criterion.

In the example of FIG. 14, the procedure and the lowest penalty-overhead service level selection was shown to occur once every analysis/predetermined time period. However, it is possible to run the procedure at a higher rate (as high as once for every new real workload data), using a sliding window whose length is equal to the analysis/predetermined period. In doing so, better performance (due to more frequent updates) can be obtained at the cost of higher computational load.

Depending on N, the order of the service level set, the update of the set can be done with multiple service levels. That is, at every update the K service levels corresponding to the highest total penalty-overhead in the set can be replaced with K new service levels, preferably with the following constraint: K<N−1.

Figure 15A:
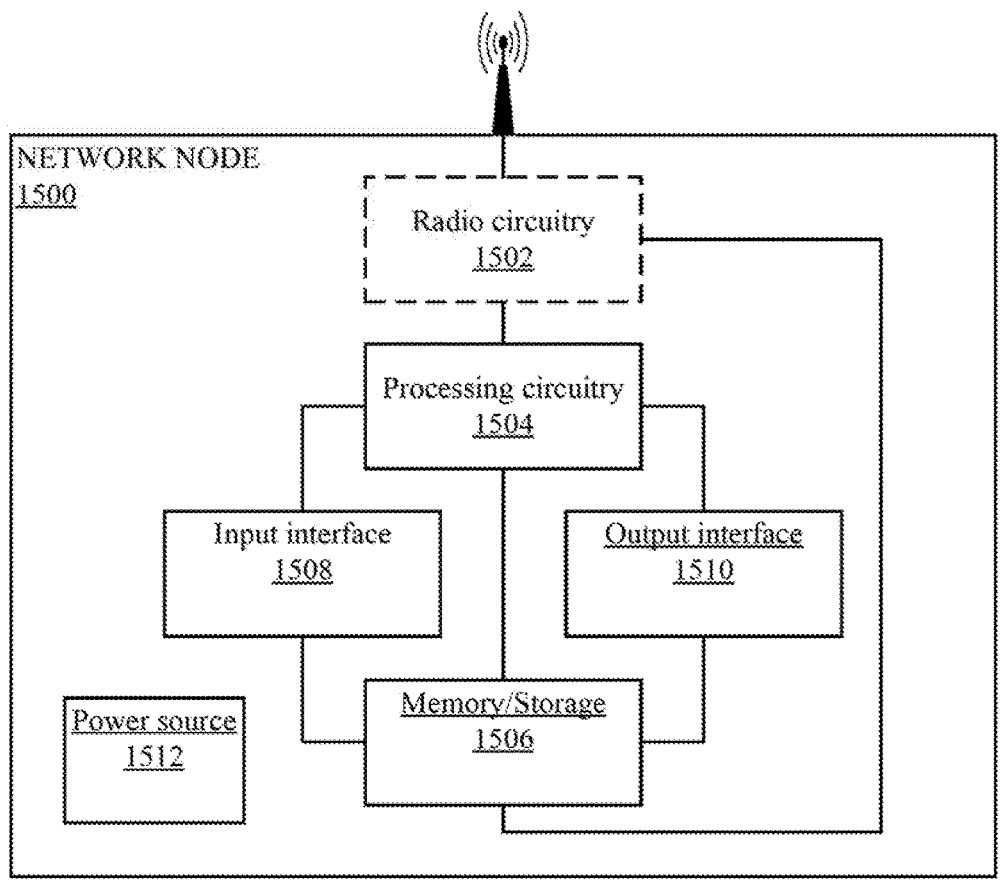
FIGS. 15a and b are a schematic illustration of network nodes according to some embodiments.

FIG. 15a is a block diagram of a network node 1500 that may be suitable for implementing aspects or steps of the methods of the embodiments disclosed herein. The network node may comprise a communications interface or radio circuitry 1502. Although all of the details of the network node 1500 are not illustrated, the network node 1500 comprises processing circuitry, one or several general-purpose or special-purpose processors 1504 or other microcontrollers programmed with suitable software programming instructions and/or firmware to carry out some or all of the functionality of the network node 1500 described herein. A memory 1506, such as a random-access memory (RAM), may be used by the processor 1504 to store data and programming instructions which, when executed by the processor 1504, implement all or part of the functionality described herein. The network node 1500 may also include one or more storage media for storing data necessary and/or suitable for implementing the functionality described herein, as well as for storing the programming instructions which, when executed on the processor 1504, implement all or part of the functionality described herein. One embodiment of the present disclosure may be implemented as a computer program product that is stored on a computer-readable storage medium, the computer program product including programming instructions that are configured to cause the processor 1504 to carry out the steps described herein. The network node 1500 may further comprise input interface 1508 and output interface 1510 allowing a user to input some data to the system, as well as a power source 1512.

Figure 15B:
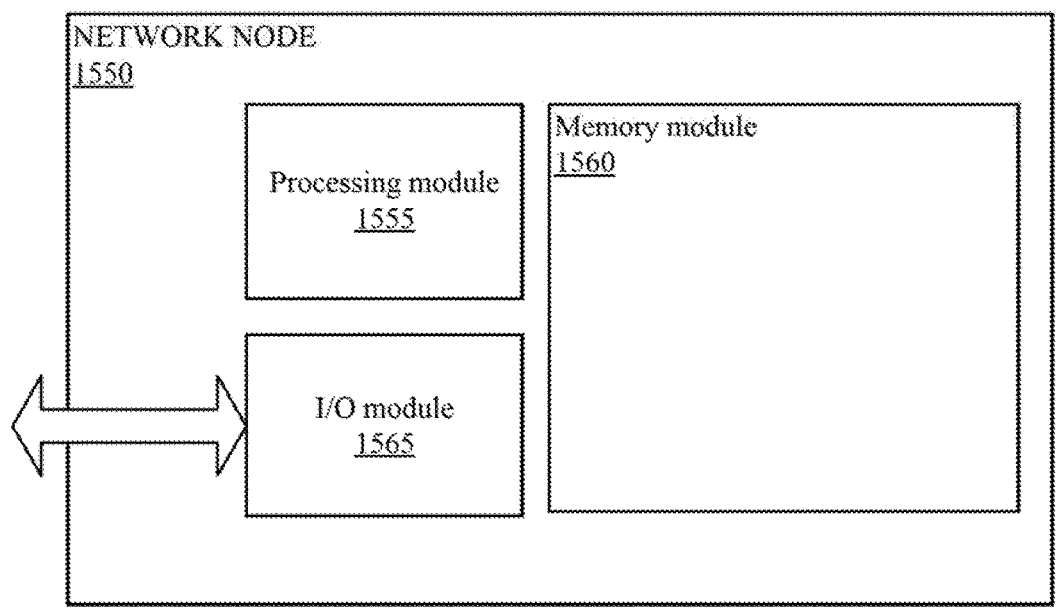

FIG. 15b illustrates a network node 1550 according to another embodiment. Any appropriate steps, methods, features, functions, or benefits disclosed herein may be performed through one or more functional units or modules of one or more virtual apparatuses such as network node 1550. Each virtual apparatus may comprise a number of these functional units 1555, 1560, 1565. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one steps of methods as well as instructions for carrying out one or more of the techniques described herein. In some implementations, the processing circuitry may be used to cause the respective functional unit to perform corresponding functions according one or more embodiments of the present disclosure.

Figure 16:
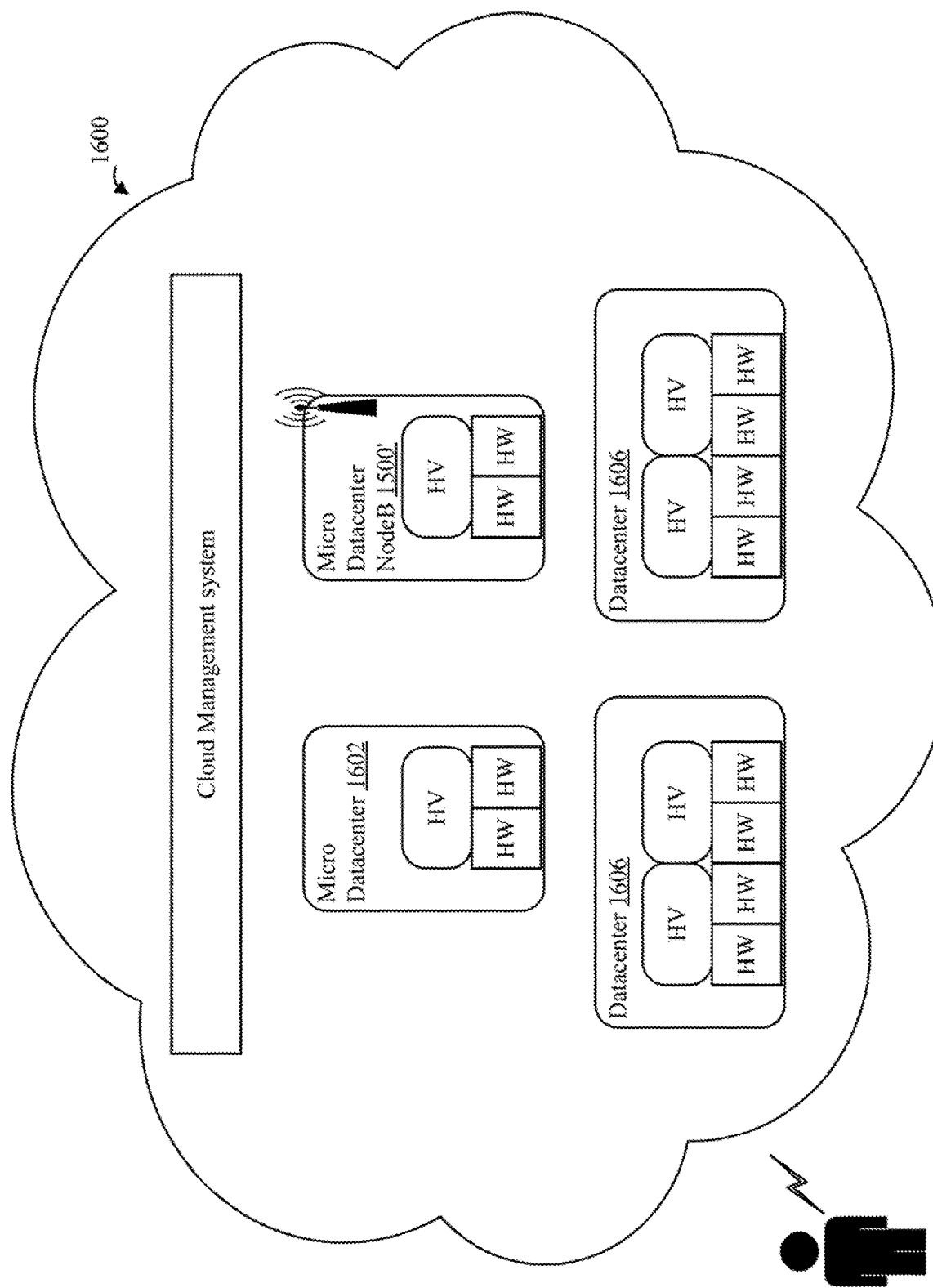
FIG. 16 is a schematic drawing of variations of data centers according to an embodiment.
Figure 17:
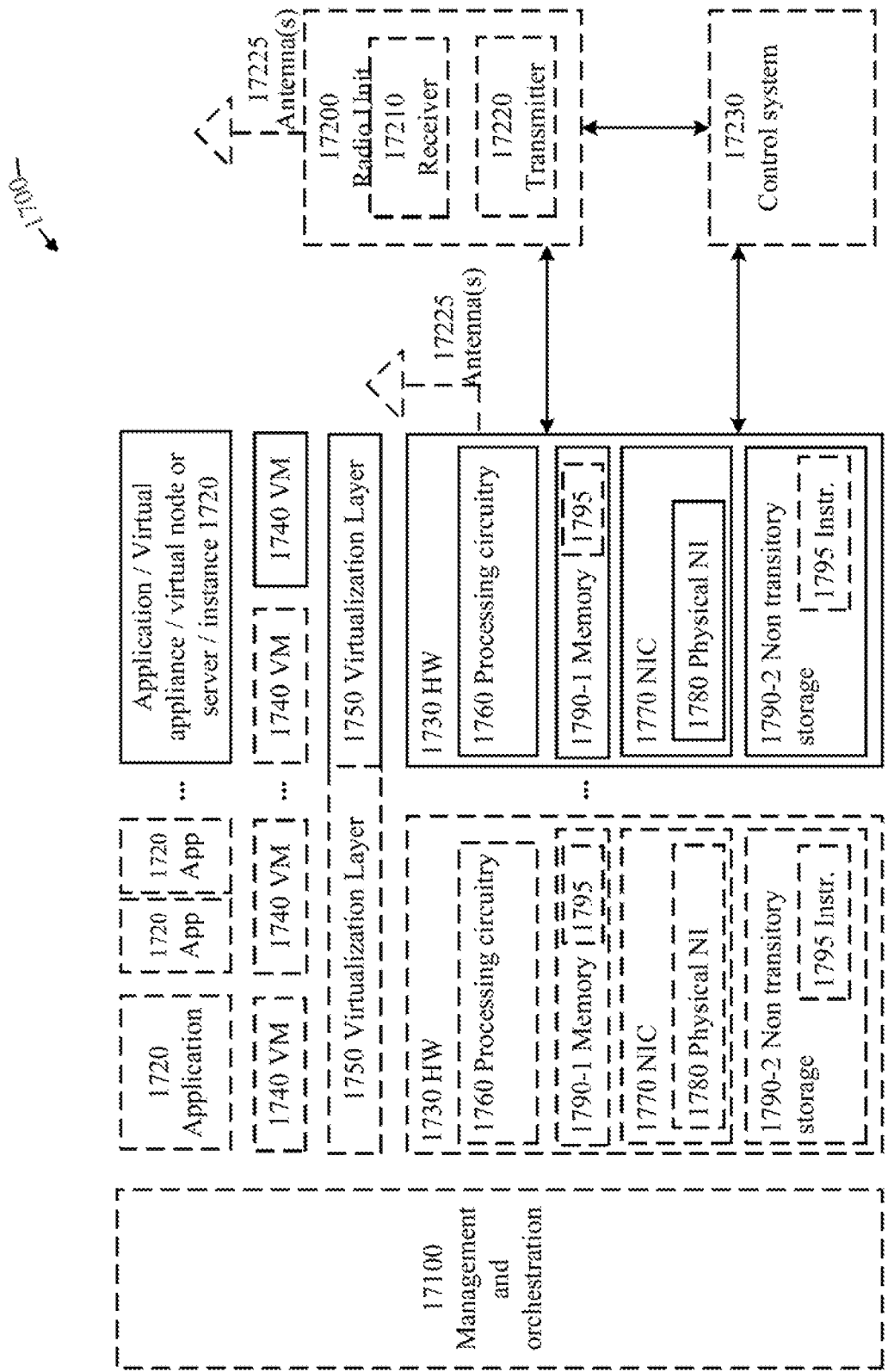
FIG. 17 is a schematic illustration of a cloud environment in which embodiments can be deployed.

The network node of FIG. 15a or 15b may be standalone or part of the datacenters or cloud hardware depicted in FIGS. 16 and 17. FIG. 16 is a schematic view of an ensemble of data centers comprising different types of data centers composed of different network nodes and hardware. For example, micro datacenters can take the form of a network node 1602 without wireless capacity or a network node 1500' with wireless capacity, such as a Node B, for example. Other data centers 1606 having more capacity are also envisioned. Each of these data centers comprises of one or more HW components on which an Operating System (OS) is executing. Applications can either run natively, in container(s) or in virtual machine(s) on the OS.

FIG. 17 is a schematic block diagram illustrating a virtualization environment 1700 in which functions implemented by some embodiments may be virtualized. As used herein, virtualization can be applied to a node (e.g., a virtualized base station or a virtualized radio access node) and relates to an implementation in which at least a portion of the functionality is implemented as one or more virtual components (e.g., via one or more applications, components, functions, virtual machines and/or containers executing on one or more physical processing nodes in one or more networks).

In some embodiments, some or all of the functions described herein may be implemented as virtual components executed by one or more virtual machines and/or containers implemented in one or more virtual environments 1700 hosted by one or more of hardware nodes 1730. Further, in some embodiments the network node may be entirely virtualized.

The functions may be implemented by one or more applications 1720 (which may alternatively be called software instances, virtual appliances, network functions, virtual nodes, virtual network functions, etc.) operative to implement steps of some methods according to some embodiments. Applications 1720 run in virtualization environment 1700 which provides hardware 1730 comprising processing circuitry 1760 and memory 1790. Memory 1790 contains instructions 1795 executable by processing circuitry 1760 whereby application 1720 is operative to provide any of the relevant features, benefits, and/or functions disclosed herein.

Virtualization environment 1700 comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by the processing circuitry 1760. Each hardware devices may comprise one or more network interface controllers 1770 (NICs), also known as network interface cards, which include physical network interface 1780. Each hardware devices may also include non-transitory, persistent, machine readable storage media 1790-2 having stored therein software 1795 and/or instruction executable by processing circuitry 1760. Software 1795 may include any type of software including software for instantiating one or more virtualization layers 1750 (also referred to as hypervisors), software to execute virtual machines and/or containers 1740 as well as software allowing to execute functions described in relation with some embodiments described herein.

Virtual machines and/or containers 1740 comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines and/or containers 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine and/or container 1740.

As shown in FIG. 17, hardware 1730 may be a standalone network node, with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a virtual machine and/or container 1740 is a software implementation of a physical machine that runs programs as if they were executing on a physical, non-virtualized machine. Each of virtual machines and/or containers 1740, and that part of the hardware 1730 that executes that virtual machine and/or container, be it hardware dedicated to that virtual machine or container and/or hardware shared by that virtual machine with others of the virtual machines and/or containers 1740, forms a separate virtual network elements (VNE).

Still in the context of NFV, Virtual Network Function (VNF) is responsible for handling specific network functions that run in one or more virtual machines and/or containers 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio unit(s) 17200 may communicate directly with hardware nodes 1730 via one or more appropriate network interfaces and may be used in combination with the virtual components to provide a virtual node with radio capabilities, such as a radio access node or a base station.

In some embodiments, some signaling can be effected with the use of control system 17230 which may alternatively be used for communication between the hardware nodes 1730 and the radio units 17200.

Figure 18:
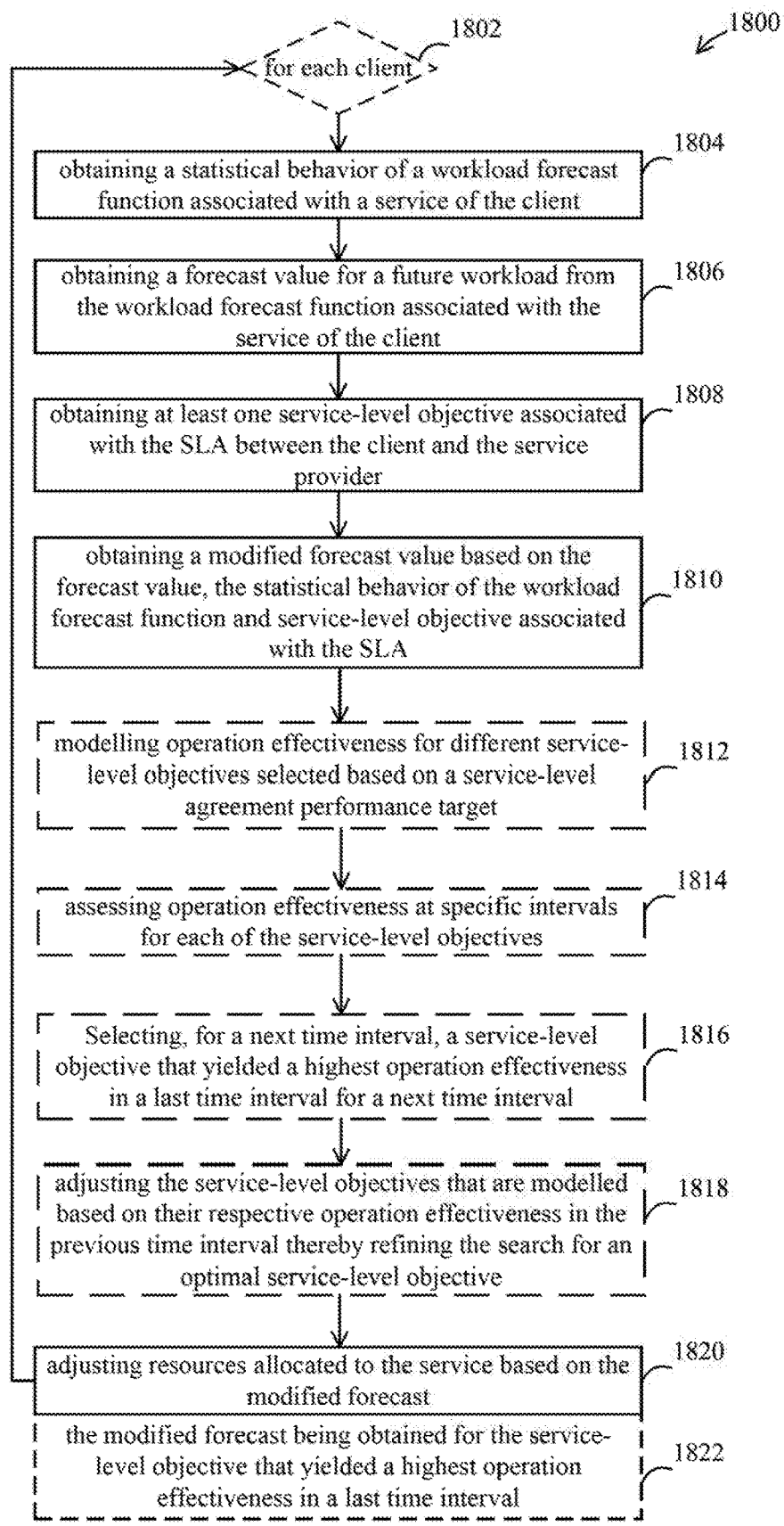
FIG. 18 is a flowchart of a method according to an embodiment.

FIG. 18 illustrates a method 1800 according to an embodiment which may be executed in a network node 1500, 1550, in a data center 1500', 1602, 1606 or in a virtualization environment 1700, as a software instance, virtual appliance, network function, virtual node or as a virtual network function. The method 1800 is executed by a service provider and aims at optimizing resource allocation according to the needs of at least one client and according to an SLA between the at least one client and the service provider. The method can be used in a context where there is a plurality of clients, each having an SLA with the service provider. In that case, the steps of the method may be executed iteratively, step 1802, for each client. The service provider may be dynamically requesting and using resources from a cloud provider. The method 1800 comprises obtaining, step 1804, a statistical behavior of a workload forecast function associated with a service of the client. Obtaining the statistical behavior may also or alternatively comprise obtaining the statistical behavior of a performance of the workload forecast. A method for obtaining the statistical behavior of the workload forecast has been previously described in relation with FIG. 3, for example, and the method 1800 may further comprise any of the steps described in relation with FIG. 3. Obtaining the statistical behavior may comprise using a ratio of predicted to real workloads. Other methods, as would be apparent to a person skilled in the art, could be used to the same end. The method comprises obtaining, step 1806, a forecast value for a future workload from the workload forecast function associated with the service of the client. The specific design of the workload forecast function may not be known to the service provider. The method comprises obtaining, step 1808, at least one service-level objective associated with the SLA between the client and the service provider. The service-level objective associated with the SLA may be a service provider defined criterion. The service-level objective may be the same as what is defined by the SLA. The service provider defined criterion may be a criterion such as an automatic criterion determined based on a ratio of a value of the SLA of the client to a penalty-overhead for renting more resources, or an automatic criterion determined based on a ratio of a value of the SLA of the client to a value of the SLAs for a plurality of other clients. The at least one service-level objective associated with the SLA may comprise a policy to adjust resources allocated to the service to a level under a minimum service-level defined within the SLA. The method comprises obtaining, step 1810, a modified forecast value based on the forecast value, the statistical behavior of the workload forecast function and service-level objective associated with the SLA. Obtaining the modified forecast value may comprise increasing or decreasing the forecast value. A method for obtaining a modified forecast value has been previously described in relation with FIG. 6, and the method 1800 may further comprise any of the steps described in relation with FIG. 6.

The method may further comprise modelling, step 1812, operation effectiveness for different service-level objectives selected based on a service-level agreement performance target. The modelling for each of the selected service-level objectives may be based on the modified forecast. The method may comprise assessing, step 1814, operation effectiveness at specific intervals for each of the service-level objectives. A method for evaluating operation effectiveness at different service-level objectives is described in relation with FIG. 8, and the method 1800 may further comprise any of the steps described in relation with FIG. 8. The method may comprise, step 1816, selecting, for a next time interval, a service-level objective that yielded a highest operation effectiveness in a last time interval. The operation effectiveness associated with the service-level objective may be one or a combination of: lower SLA violation penalty, lower unused resources, and lower energy footprint. The method may further comprise adjusting, step 1818, the service-level objectives that are modelled based on their respective operation effectiveness in the previous time interval thereby refining the search for an optimal service-level objective. A method for optimizing operation effectiveness has been previously described in relation with FIG. 13, and the method 1800 may further comprise any of the steps described in relation with FIG. 13.

The method comprises adjusting, step 1820, resources allocated to the service based on the modified forecast. The modified forecast may be the modified forecast obtained for the service-level objective that yielded a highest operation effectiveness in a last time interval, 1822.

Referring back to FIG. 15a there is provided a network node 1500 for optimizing resource allocation according to the needs of at least one client and according to an SLA between the at least one client and the service provider. The network node comprises processing circuitry 1504 and a transceiver (which may be a radio unit 1502) configured, in combination, to: obtain a statistical behavior of a workload forecast function associated with a service of the client, obtain a forecast value for a future workload from the workload forecast function associated with the service of the client, obtain at least one service-level objective associated with the SLA between the client and the service provider, obtain a modified forecast value based on the forecast value, the statistical behavior of the workload forecast function and service-level objective associated with the SLA, and adjust resources allocated to the service based on the modified forecast. The network node further comprises a power supply circuitry 1512 configured to supply power to said network node 1500. The network node may be configured to execute any of the steps of the methods described herein.

Referring to FIGS. 15a and b, and 17, there is provided a non-transitory computer readable media 1506, 1560, 1790-2 having stored thereon instructions for optimizing resource allocation according to the needs of at least one client and according to an SLA between the at least one client and the service provider. The instructions comprise obtaining a statistical behavior of a workload forecast function associated with a service of the client, obtaining a forecast value for a future workload from the workload forecast function associated with the service of the client, obtaining at least one service-level objective associated with the SLA between the client and the service provider, obtaining a modified forecast value based on the forecast value, the statistical behavior of the workload forecast function and service-level objective associated with the SLA, and adjusting resources allocated to the service based on the modified forecast. The non-transitory computer readable media may be configured to store thereon instructions concerning any of the steps of the methods described herein.

Referring to FIG. 17, there is provided a service instance 1720 for optimizing resources allocation according to the needs of at least one client and according to an SLA between the at least one client and the service provider. The service instance 1720 runs in a cloud computing environment 1700 which provides processing 1760 and interface circuitry and memory 1790 for running the service instance. The memory 1790 containing instructions executable by the processing circuitry 1760 whereby said service instance is operative to obtain a statistical behavior of a workload forecast function associated with a service of the client, obtain a forecast value for a future workload from the workload forecast function associated with the service of the client, obtain at least one service-level objective associated with the SLA between the client and the service provider, obtain a modified forecast value based on the forecast value, the statistical behavior of the workload forecast function and service-level objective associated with the SLA, and adjust resources allocated to the service based on the modified forecast. The service instance may be configured to execute any of the steps of the methods described herein.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed by a service provider, for optimizing resource allocation according to the needs of at least one client and according to a Service-Level Agreement (SLA) between the at least one client and the service provider, the method comprising:
   obtaining a statistical behavior of a workload forecast function associated with a service of the at least one client;
   obtaining a forecast value for a future workload from the workload forecast function associated with the service of the at least one client;
   obtaining at least one service-level objective associated with the SLA between the at least one client and the service provider;
   obtaining a modified forecast value based on the forecast value, the statistical behavior of the workload forecast function and service-level objective associated with the SLA;
   modelling operation effectiveness for different service-level objectives selected based on a service-level agreement performance target;
   assessing the operation effectiveness at specific intervals for each of the service-level objectives;
   selecting, for a next time interval, a service-level objective that yielded a highest operation effectiveness in a last time interval; and
   adjusting resources allocated to the service based on the modified forecast value thereby optimizing resource allocation for the at least one client, wherein the modified forecast value is obtained for the service-level objective that yielded a highest operation effectiveness in a last time interval.

2. The method of claim 1, wherein the service provider is dynamically requesting and using the resources from a cloud provider.

3. The method of claim 1, wherein there is a plurality of clients, each having an SLA with the service provider.

4. The method of claim 3, wherein the method is executed iteratively, for each client.

5. The method of claim 1, wherein obtaining the statistical behavior comprises obtaining a statistical behavior of a performance of the workload forecast.

6. The method of claim 1, wherein obtaining the statistical behavior comprises using a ratio of predicted to real workloads.

7. The method of claim 1, wherein the workload forecast function is not known to the service provider.

8. The method of claim 1, wherein the service-level objective associated with the SLA is a service provider defined criterion.

9. The method of claim 1, wherein the at least one service-level objective associated with the SLA comprises a policy to adjust the resources allocated to the service to a level under a minimum service-level defined within the SLA.

10. The method of claim 1, wherein the operation effectiveness associated with the service-level objective is one or a combination of: lower SLA violation penalty, lower unused resources, and lower energy footprint.

11. The method of claim 1, wherein modelling for each of the selected service-level objectives is based on the modified forecast.

12. The method of claim 1, further comprising adjusting the service-level objectives that are modelled based on their respective operation effectiveness in a previous time interval thereby refining a search for an optimal service-level objective.

13. A network node for optimizing resource allocation according to the needs of at least one client and according to a Service-Level Agreement (SLA) between the at least one client and a service provider, the network node comprising:
   processing circuitry and a transceiver configured, in combination, to:
      obtain a statistical behavior of a workload forecast function associated with a service of the at least one client;
      obtain a forecast value for a future workload from the workload forecast function associated with the service of the at least one client;
      obtain at least one service-level objective associated with the SLA between the at least one client and the service provider;
      obtain a modified forecast value based on the forecast value, the statistical behavior of the workload forecast function and service-level objective associated with the SLA;
      model operation effectiveness for different service-level objectives selected based on a service-level agreement performance target;
      assess the operation effectiveness at specific intervals for each of the service-level objectives;

select, for a next time interval, a service-level objective that yielded a highest operation effectiveness in a last time interval; and adjust resources allocated to the service based on the modified forecast value, wherein the modified forecast value is obtained for the service-level objective that yielded a highest operation effectiveness in a last time interval; and power supply circuitry configured to supply power to said network node.

14. A non-transitory computer readable media having stored thereon instructions for optimizing resource allocation according to the needs of at least one client and according to a Service-Level Agreement (SLA) between the at least one client and a service provider, said instructions comprising:

obtaining a statistical behavior of a workload forecast function associated with a service of the at least one client;

obtaining a forecast value for a future workload from the workload forecast function associated with the service of the at least one client;

obtaining at least one service-level objective associated with the SLA between the at least one client and the service provider;

obtaining a modified forecast value based on the forecast value, the statistical behavior of the workload forecast function and service-level objective associated with the SLA;

modelling operation effectiveness for different service-level objectives selected based on a service-level agreement performance target;

assessing the operation effectiveness at specific intervals for each of the service-level objectives;

selecting, for a next time interval, a service-level objective that yielded a highest operation effectiveness in a last time interval; and adjusting resources allocated to the service based on the modified forecast value, wherein the modified forecast value is obtained for the service-level objective that yielded a highest operation effectiveness in a last time interval.

15. A service instance for optimizing resource allocation according to the needs of at least one client and according to a Service-Level Agreement (SLA) between the at least one client and a service provider, in a cloud computing environment which provides processing circuitry, interface circuitry and memory for running the service instance, said memory containing instructions executable by said processing circuitry whereby said service instance is operative to:

obtain a statistical behavior of a workload forecast function associated with a service of the at least one client;

obtain a forecast value for a future workload from the workload forecast function associated with the service of the at least one client;

obtain at least one service-level objective associated with the SLA between the at least one client and the service provider;

obtain a modified forecast value based on the forecast value, the statistical behavior of the workload forecast function and service-level objective associated with the SLA;

model operation effectiveness for different service-level objectives selected based on a service-level agreement performance target;

assess the operation effectiveness at specific intervals for each of the service-level objectives;

select, for a next time interval, a service-level objective that yielded a highest operation effectiveness in a last time interval; and adjust resources allocated to the service based on the modified forecast value, wherein the modified forecast value is obtained for the service-level objective that yielded a highest operation effectiveness in a last time interval.

* * * * *